United States Patent
Benning et al.

(10) Patent No.: US 6,711,224 B1
(45) Date of Patent: Mar. 23, 2004

(54) TIMING ACQUISITION ALGORITHM FOR AN ADAPTIVE ANTENNA ARRAY

(75) Inventors: Roger David Benning, Long Valley, NJ (US); Hongyi Wang, Livingston, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/535,710

(22) Filed: Mar. 27, 2000

(51) Int. Cl.$^7$ ................................................. H04L 7/06
(52) U.S. Cl. ...................... 375/364; 375/365; 375/366
(58) Field of Search ................................. 375/137, 142, 375/143, 144, 145, 148, 149, 150, 152, 260, 259, 267, 284, 285, 324, 365, 366, 368; 455/501, 502, 504, 63, 67.3, 272, 277.1, 277.2, 296; 370/324, 350, 520, 503, 509, 510, 512, 513, 514

(56) References Cited

U.S. PATENT DOCUMENTS

| | | | | |
|---|---|---|---|---|
| 5,790,606 A | * | 8/1998 | Dent | 375/348 |
| 6,081,547 A | * | 6/2000 | Miya | 375/130 |
| 6,173,014 B1 | * | 1/2001 | Forssen et al. | 375/267 |
| 6,363,104 B1 | * | 3/2002 | Bottomley | 375/148 |
| 6,480,558 B1 | * | 11/2002 | Ottosson et al. | 375/350 |

* cited by examiner

Primary Examiner—Khai Tran

(57) ABSTRACT

A timing acquisition algorithm for locating the sync timing position of a sync word embedded in a received signal for achieving synchronization between the received signal and a base station, e.g., a base station receiving the received signal, within a wireless telecommunications system. The timing acquisition algorithm is preferably a set of programmable instructions incorporated within a software package and processed by a processor at the within the wireless telecommunications system, such as at the base station. The timing acquisition algorithm gets rid of the unlikely sync timing position for each branch of an adaptive antenna array in the first step; gets rid of the unlikely sync timing position for all branches in the second step; and uses optimal diversity combining for the remaining timing position and uses the conventional correlation or mean-square-error (MSE) approach on the combined data in the third step to finally locate the timing position of the sync word. The first two steps limit the computational load of the third step to a reasonable level. For example, if only two sync timing positions remain after the first two steps, then during the third step, weight calculations need only be performed twice, i.e., one for each sync timing position that still remains.

21 Claims, 29 Drawing Sheets

Step 1: Cross-correlation functions for each antenna

Arrows indicate positions of the m=2 peaks on each antenna

Step 2: Positions of the n=2 highest peaks across all antennas

Step 3: The single highest peak after applying MMSE/DL adaptive algorithm

FIG. 2

Desired signal: | 1 | 2 | 3 |

Interference signal: | 2* | 3 | 1 | order scrambled to indicate that SYNC word is different relative to desired signal

FIG. 3

Desired signal: | 1 | 2 | 3 |

$T_{off}$

Interference signal: | 1 | 2 | 3 |

FIG. 4
Step 1: Cross-correlation functions for each antenna
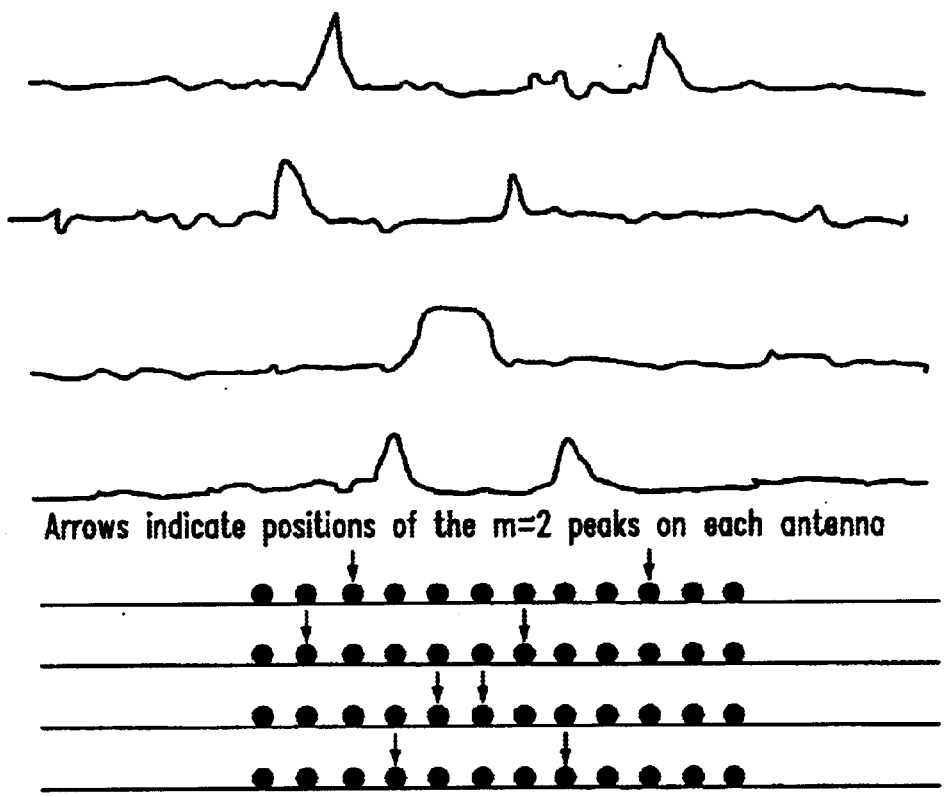
Arrows indicate positions of the m=2 peaks on each antenna
Step 2: Positions of the n=2 highest peaks across all antennas
Step 3: The single highest peak after applying MMSE/DL adaptive algorithm

BER performance comparison based on the synchronized time slot model
(Two interferers, SNR=20dB, Fading rate=180Hz, FBJA for demodulation)

BER performance comparison based on the unsynchronized time slot model
(Two interferers, SNR=20dB, Fading rate=180Hz, FBIA for demodulation)

BER performance comparison based on the synchronized time slot model
(Two interferers, SNR=20dB, Fading rate=50Hz, MRC for demodulation)

BER performance comparison based on the synchronized time slot model
(Two interferers, SNR=20dB, Fading rate=180Hz, MRC for demodulation)

BER performance comparison based on the unsynchronized time slot model
(Two interferers, SNR=20dB, Fading rate=50Hz, MRC for demodulation)

BER performance comparison based on the synchronized time slot model
(One interferer, SNR=20dB, Fading rate=50Hz, FBIA for demodulation)

BER performance comparison based on the synchronized time slot model
(One interferer, SNR=20dB, Fading rate=180Hz, FBIA for demodulation)

BER performance comparison based on the unsynchronized time slot model
(One interferer, SNR=20dB, Fading rate=50Hz, FBIA for demodulation)

BER performance comparison based on the unsynchronized time slot model
(One interferer, SNR=20dB, Fading rate=180Hz, FBIA for demodulation)

BER performance comparison based on the synchronized time slot model (One interferer, SNR=20dB, Fading rate=50Hz, MRC for demodulation)

BER performance comparison based on the synchronized time slot model
(Fading rate=50Hz, FBIA for demodulation)
(1000 frame used for simulation)

BER performance comparison based on the synchronized time slot model
(Fading rate=180Hz, FBIA for demodulation)
(1000 frame used for simulation)

BER performance comparison based on the synchronized time slot model
(Fading rate=180Hz, MRC for demodulation)
(1000 frame used for simulation)

Worst case (C/I=0dB) BER performance comparison based on the synchronized time slot model (One interferer, Fading rate=50Hz, FBIA for demodulation)

BER performance of three-step algorithm at different n
(Based on the synchronized time slot model, One interferer, SNR(dB)=INR(dB)=20dB, Fading rate=50Hz, FBIA for demodulation)

BER performance comparison based on the synchronized time slot model (One interferer, C/I=5dB, Fading rate=50Hz, FBIA for demodulation)

BER performance comparison based on the synchronized time slot model
(One interferer, C/I=5dB, Fading rate=0Hz, FBIA for demodulation)

TIMING ACQUISITION ALGORITHM FOR AN ADAPTIVE ANTENNA ARRAY

BACKGROUND OF THE INVENTION

1. Field of the Invention

The present invention relates generally to wireless telecommunications systems, and more particularly to a timing acquisition algorithm for an adaptive antenna array to increase range of signals received from multiple antennas and suppress interference(s).

2. Description of the Prior Art

With the correct symbol timing and carrier frequency, an adaptive antenna array can generate weights to combine signals received from multiple antennas to increase range and suppress interference(s). However, prior to adaptive array combining, the received desired signals may be severely masked by noise and interference(s). To fully make use of the adaptive antenna array, a timing acquisition technique or algorithm is needed.

The objective of timing acquisition algorithms is to locate the correct timing position of a sync word embedded in received signals. One prior art timing acquisition algorithm uses the cross-correlation approach to identify and locate the timing position of the sync word. For each antenna, a correlation of received samples and the designated sync word is performed over a window of samples (9.5 symbol period), and the set of samples that produce the maximum cross-correlation value will be considered as the synchronization samples. However, in the interference-dominated environment, it can easily happen the signal is in deep fade on one of the diversity branches, but the interference(s) are not in a deep fade on that branch. The signal can be severely masked by the interference(s) on that branch and will cause incorrectly chosen of the sync-position on that branch.

In another prior art timing acquisition algorithm, the timing position of the sync word is identified and located using a mean-square-error (MSE) method. First, the antenna with the strongest signal energy is selected. Then, a MSE between the received samples on the selected antenna and the designated sync word is calculated over a window of samples. The set of samples that produce the minimum MSE will be considered as the synchronized samples. However, in the interference-dominated environment, the antenna that has the strongest received signal energy may not be the antenna that has the strongest desired signal energy. There is a significant chance that most of the energy is from the interference(s).

Neither the correlation approach nor the MSE approach use any weighted and combined signals from all the branches which can effectively combat fading and interference. Even though these techniques may work well for two-branch-antenna-diversity system and an low interference environment, these techniques are not suitable for a four-branch-antenna-diversity system.

Another prior art diversity combining technique is designed to combine signals from all the branches using the Maximum Ratio Combining (MRC) technique. Correlation or MSE approaches can finally be used on the combined signals to identify the position of the sync word. This diversity combining technique has been shown to be efficient under flat fading and noise limited environments, but not too efficient under an interference dominated environment.

Another prior art timing acquisition algorithm, called an interference-cancellation-first algorithm, is proposed by Cupo et al. in "A Four-Element Adaptive Antenna Array for IS-136 PCS Base Station," technical memorandum, AT&T Labs and Bell Labs, 1997, and designed to combine signals from all the branches. In this algorithm, diversity combining weights are first generated using a designated sync word and the samples associated with each timing epoch. The received signals in each timing epoch are then weighted and combined. Correlation or MSE approaches can finally be used,on the combined signals to identify the sync position. The combined signal from the sample set with the right sync position should have the highest SIR and will end up with the lowest MSE or highest correlation value at the end.

Although the interference-cancellation-first algorithm is an effective algorithm, since it optimally combines signals from all the branches, the complexity of the technique is high. The combining weights have to be found for samples in each epoch. If the search window size is seven symbols (size of 6.5 symbols is used in DRM and size of 9.5 symbols is used in EDRU), the algorithm has to calculate the covariance matrix, cross-correlation matrix and combining weights 28 times (seven symbols multiplied by four oversampling values).

Accordingly, a need exists for a non-complex timing acquisition algorithm for an adaptive antenna array which utilizes the signals from all the branches of the antenna array to increase range and suppress interference(s).

SUMMARY OF THE INVENTION

The timing acquisition algorithm is a three-step time synchronization technique for locating the sync timing position of a sync word embedded in a signal received at a base station for achieving synchronization between the received signal and the base station within a wireless telecommunications system. The timing acquisition algorithm is preferably processed by a processor located at the base station.

The algorithm gets rid of the unlikely sync timing position for each branch in the first step; gets rid of the unlikely sync timing position for all branches in the second step; and uses optimal diversity combining for the remaining timing position and uses the conventional correlation or mean-square-error (MSE) approach on the combined data in the third step to finally locate the timing position of the sync word. The first two steps limit the computational load of the third step to a reasonable level. For example, if only two sync timing positions remain after the first two steps, then during the third step, weight calculations need only be performed twice, i.e., one for each sync timing position that still remains.

BRIEF DESCRIPTION OF THE DRAWINGS

Various preferred embodiments are described herein with references to the drawings:

FIG. 2 illustrates relative positions of a desired signal and interference signal time slot where all base stations in the wireless telecommunications system are synchronized;

FIG. 3 illustrates relative positions of the desired signal and interference signal time slot where all base stations in the wireless telecommunications system are not synchronized;

FIG. 4 illustrates the three-step timing acquisition algorithm of the present invention.

DETAILED DESCRIPTION OF THE PREFERRED EMBODIMENTS

Figure 1:
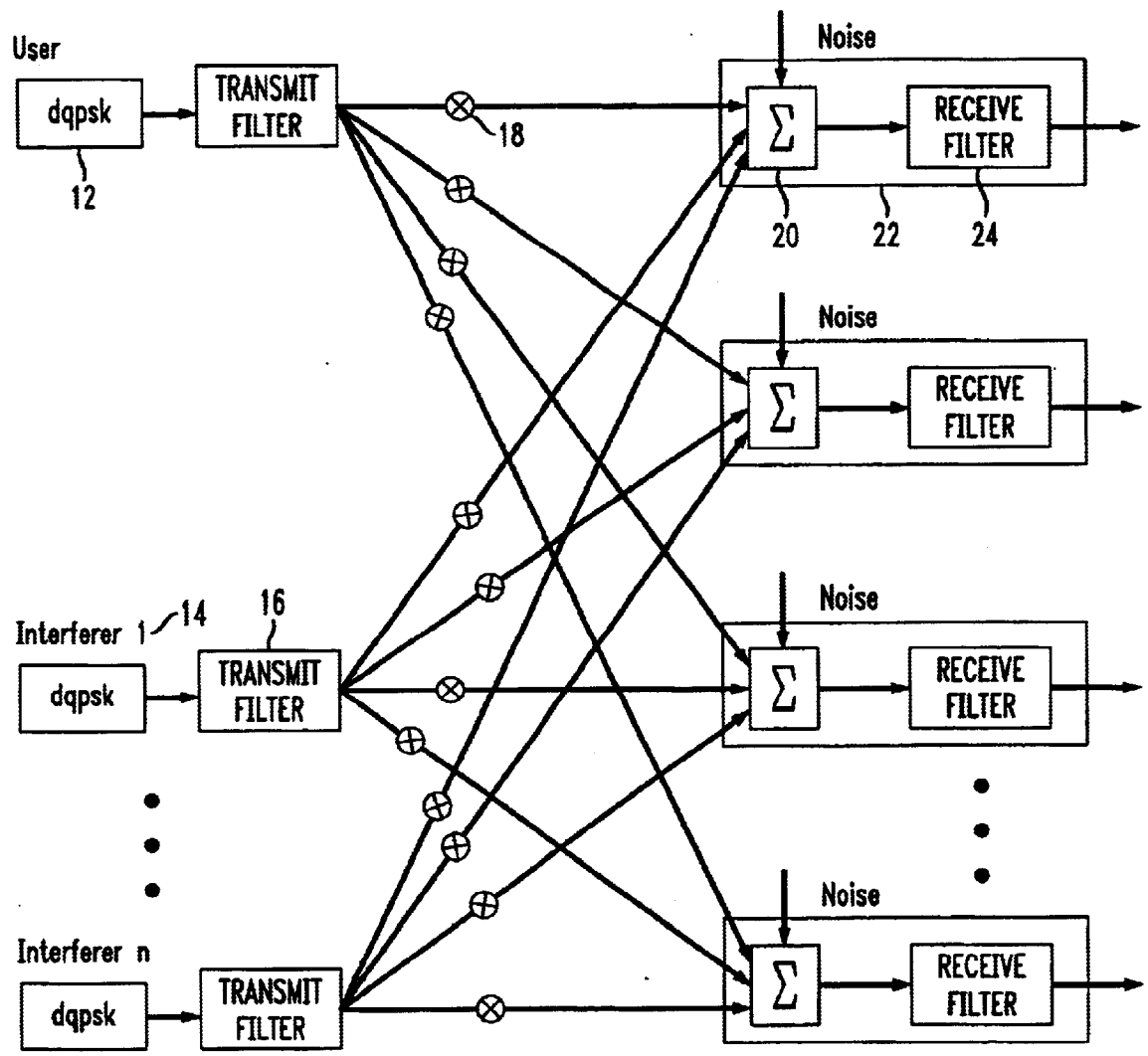
FIG. 1 illustrates a baseband simulation model.

Referring now in detail to the drawings, in which like reference numerals represent similar or identical elements throughout the several views, and with particular reference to FIG. 1, there is shown a block diagram of a baseband simulation model used to generate the four-times over-sampled received signal used by the present invention. Even though FIG. 1 illustrates the received signal being sampled four times, it is contemplated that the principles and teachings of the present invention can be used to locate the position of the sync word for a received signal which is sampled more or less than four times.

Modulated signals 12 from a user, e.g., a mobile station, or from a plurality of co-channel interferers 14, e.g., co-channel interference signal(s), are first passed through transmit filters 16. Transmit filters 16 are preferably root-raised-cosine transmit filters with an 0.35 excess bandwidth factor. Each signal is then passed through four independent channels 18. The channels 18 are preferably Rayleigh flat-fading channels generated by Jakes' model to model the signal received at four antennas. The faded signal, interference signal(s) and white noise are added together by summation blocks 20 at each receiving antenna 22. The combined signals are then passed through receive filters 24. The receive filters 24 are preferably root-raised cosine receive filters with an 0.35 excess bandwidth factor. The signals are hence four times over-sampled. The over-sampled baseband signals corrupted by the co-channel interference signal(s) and white noise are used later for time-synchronization and demodulation.

There are two possible ways that the faded signal and interference signal(s) can be added by summation blocks 20. In a first case, the base stations are all synchronized and optimally planned. The faded signal and interference signal(s) are not only synchronized, but also use a different synchronization word. The first case is illustrated in FIG. 2. In a second case, the base stations are not synchronized and neither are the faded signal and interference signal(s). The time offset, $T_{off}$, between the faded signal and interference signal(s) is arbitrary. During one slot interval, the desired signal can be interfered by co-channel signals from two different mobile stations. The second case is illustrated in FIG. 3.

With reference to FIG. 4, there is shown the three-step timing acquisition algorithm of the present invention for locating the timing position of a sync word embedded in a received signal (i.e., timing position of the received signal) for achieving synchronization between the received signal and the base station within the wireless telecommunications system. The timing acquisition algorithm is preferably a set of programmable instructions incorporated within a software package and processed by a processor at the base station.

The three-step timing acquisition algorithm in step one gets rid of the unlikely sync timing positions for each antenna branch (the positions which are not indicated by an arrow). In step two, the algorithm gets rid of the unlikely sync timing positions for all branches. Finally, in step three, the algorithm uses diversity combining for the remaining timing positions and uses the conventional correlation or mean-square-error (MSE) approach on the combined data to finally locate the timing position of the sync word. Accordingly, timing acquisition is performed by steps one and two prior to antenna array combining by step three. Hence, steps one and two limit the computational load of the third step to a reasonable level. For example, if only two sync timing positions remain after the first two steps, then during the third step, weight calculations need only be performed twice, i.e., one for each sync timing position that still remains.

It is also contemplated to first determine x number of the highest peaks across all antennas, e.g., determine the four highest peaks across all antennas, and then eliminate all peaks except y number of the highest peaks, e.g., eliminate all peaks except the two highest peaks, where x>y (in the example, x=4 and y=2) and the peaks remaining are the highest peaks. Finally, the timing position of the received signal is located by combining the remaining sync timing positions (in the example, combining the two remaining sync timing positions).

FIG. 4 illustrates the three-step timing acquisition algorithm for an adaptive antenna array having four branches. It is contemplated that the timing acquisition algorithm of the present invention can be used to locate the timing position of the sync word for adaptive antenna arrays having any number of branches.

In a preferred embodiment, the three-step timing acquisition algorithm in step one computes the cross-correlation of received samples and the designated sync word over a range of samples. Preferably, the algorithm computes a 14-symbol cross-correlation of received samples and the designated sync word over a predetermined range of samples, e.g., 7-symbol periods. Further, in this step, the algorithm computes the magnitude of the correlation value and finds the m largest correlation values and corresponding positions. (m=2 was used in the simulation model (see FIGS. 5–20)).

In step two, the three-step timing acquisition algorithm finds the n positions which generated the n largest correlation values from among the m times the number of antenna branches positions, i.e., 2*4=8 positions for the simulation model (n=2 was used in the simulation model (see FIGS. 5–20)). In step three, the three-step timing acquisition algorithm uses the diagonal loading Minimum Mean Square Error (MMSE) algorithm, as known by one ordinarily skilled in the art, to find the antenna weights for the selected n sample sets. Further, in this step, the algorithm combines the antenna samples with the corresponding weights and uses the correlation or MSE technique on each of the n combined sample sets. Further, in step three, the algorithm identifies the final timing position of the sync word that is associated with the largest correlation value or lowest MSE value among the n values.

Simulation results are presented by FIGS. 5–30. These figures also compare the performance of the inventive three-step timing acquisition algorithm with several prior art algorithms and an ideal synchronization case. T/4 is used as the step size in all the sync position search algorithms. The search window size is seven symbols.

In FIGS. 5–12, 500 frames are used for data point at INR (Interference to Noise Ratio) 20 dB and 3000, 5500, 8000 and 10,000 are used for data point at INR 15, 10, 5 and 0 dB, respectively.

In FIGS. 5–30, perf represents the ideal synchronization case; corr1 represents the single antenna correlation based sync algorithm; mse represents the MSE based sync algorithm; corr2 represents a correlation based sync algorithm in which the single antenna correlation based algorithm is used first, and then the final unique sync position is located by choosing the one with the highest correlation value among the four; icf represents the interference-cancellation-first algorithm; and 3step represents the three-step timing acquisition algorithm of the present invention.

Figure 5:
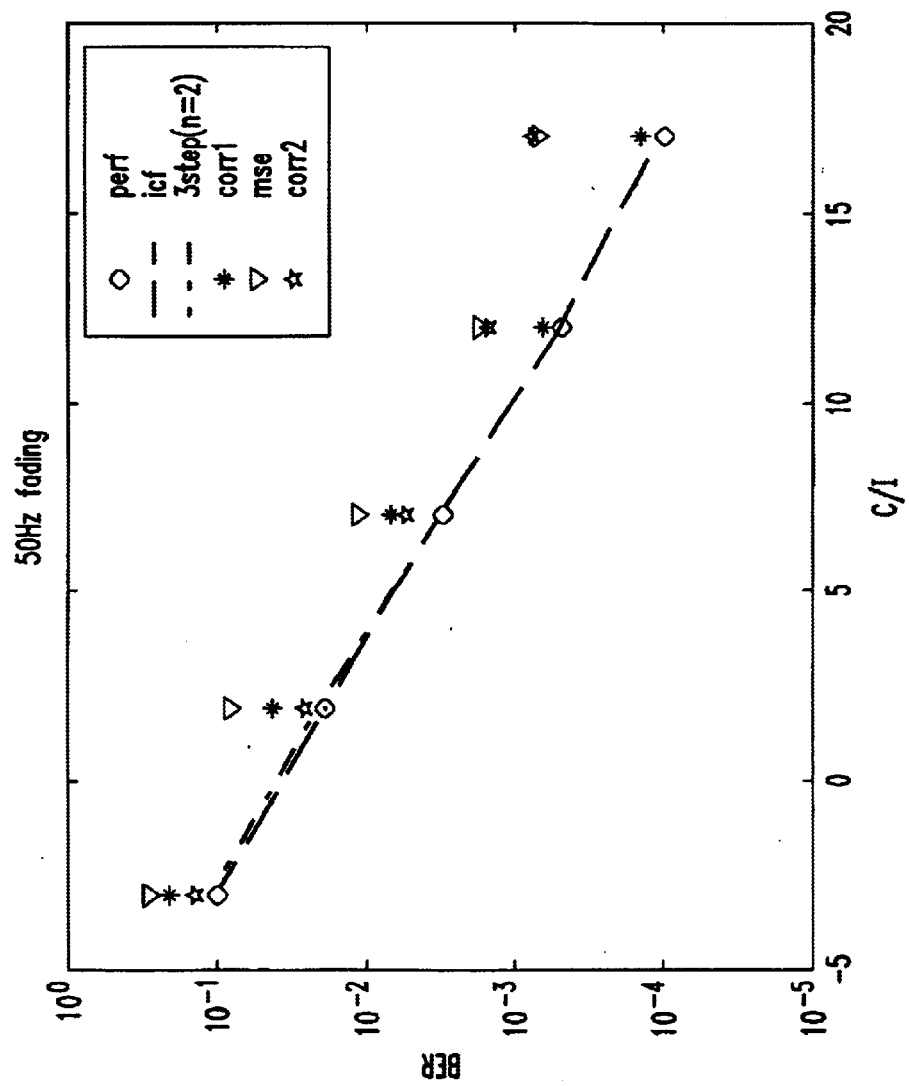
FIGS. 5–30 illustrate simulation results comparing the three-step timing acquisition algorithm of the present invention with several prior art timing acquisition algorithms and an ideal timing acquisition case.
Figure 6:
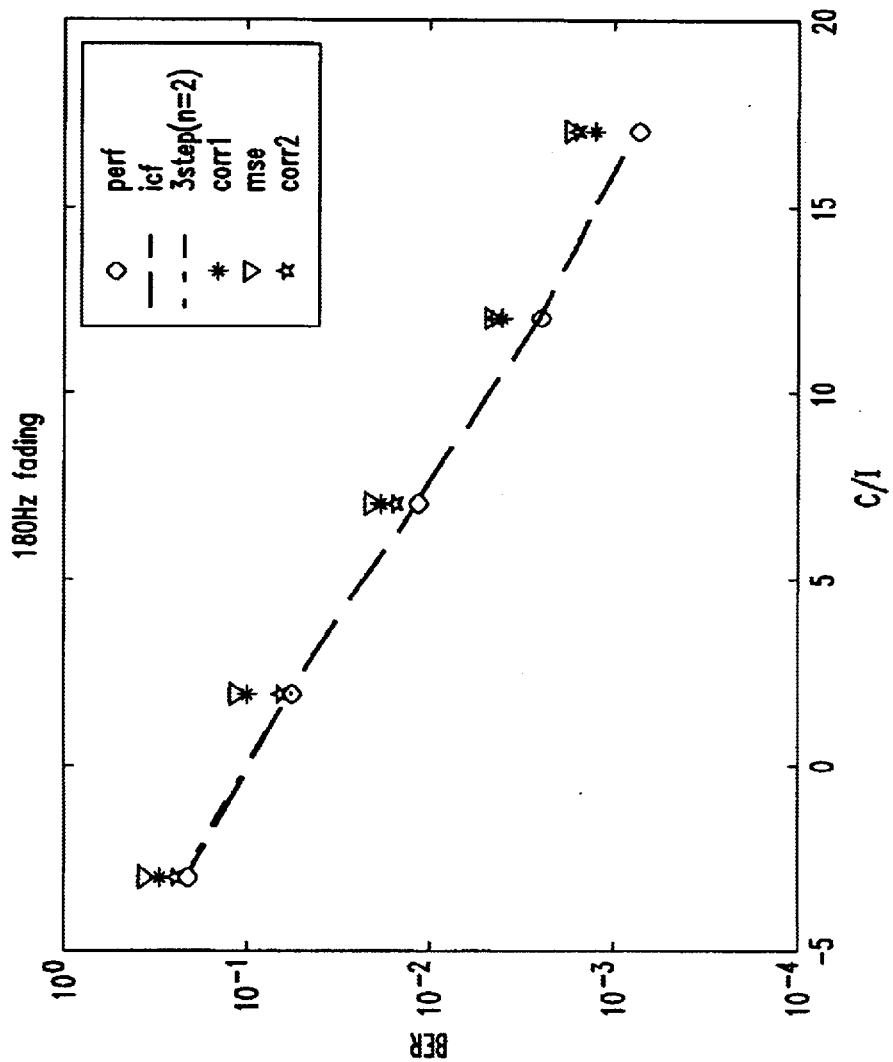
Figure 7:
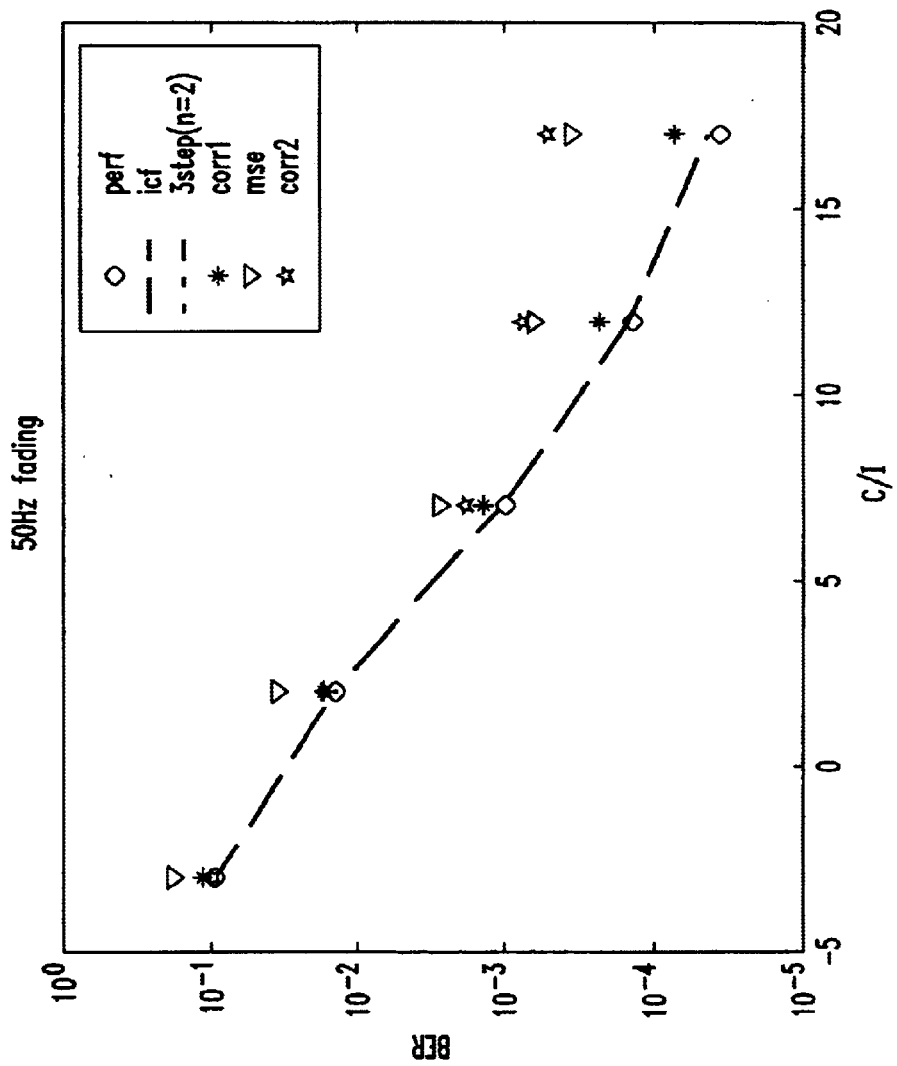
Figure 8:
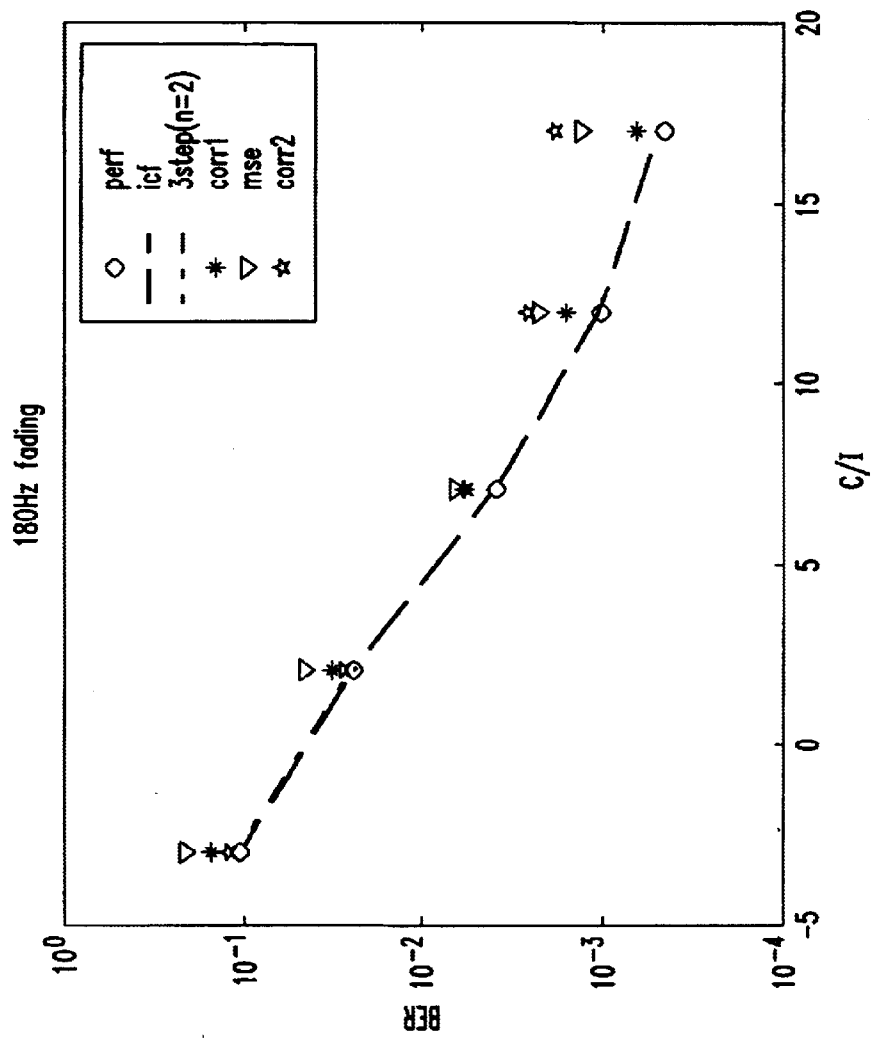

In FIGS. 5–8, the diagonal loading MMSE algorithm-Four Branch Intelligent Antenna (FBIA) and differential decoding are used for the diversity combining and demodulation after the time synchronization is finished. The diagonal loading factor is chosen to be 0.0322 (same value as used in the Two Branch Intelligent Antenna (TBIA)). Two interferers are simulated. In FIGS. 5–6, both interferers appear in the whole time slot. In FIGS. 7–8, one interferer appears in part of the time slot and the other interferer appears in the rest of the time slot. The SNR is 20 dB. The fading rate is 50 Hz in FIGS. 5 and 7 and 180 Hz in FIGS. 6 and 8 for the fading signal and interference signal(s).

Figure 9:
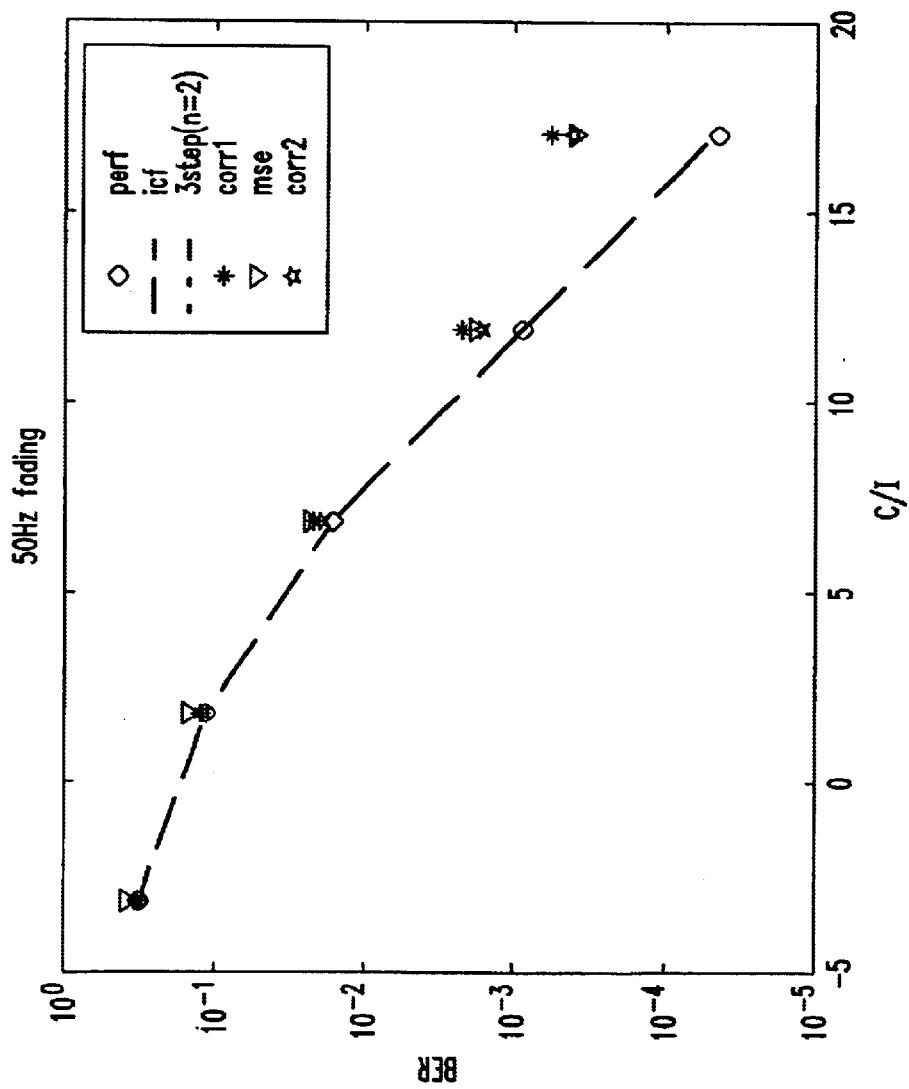
Figure 10:
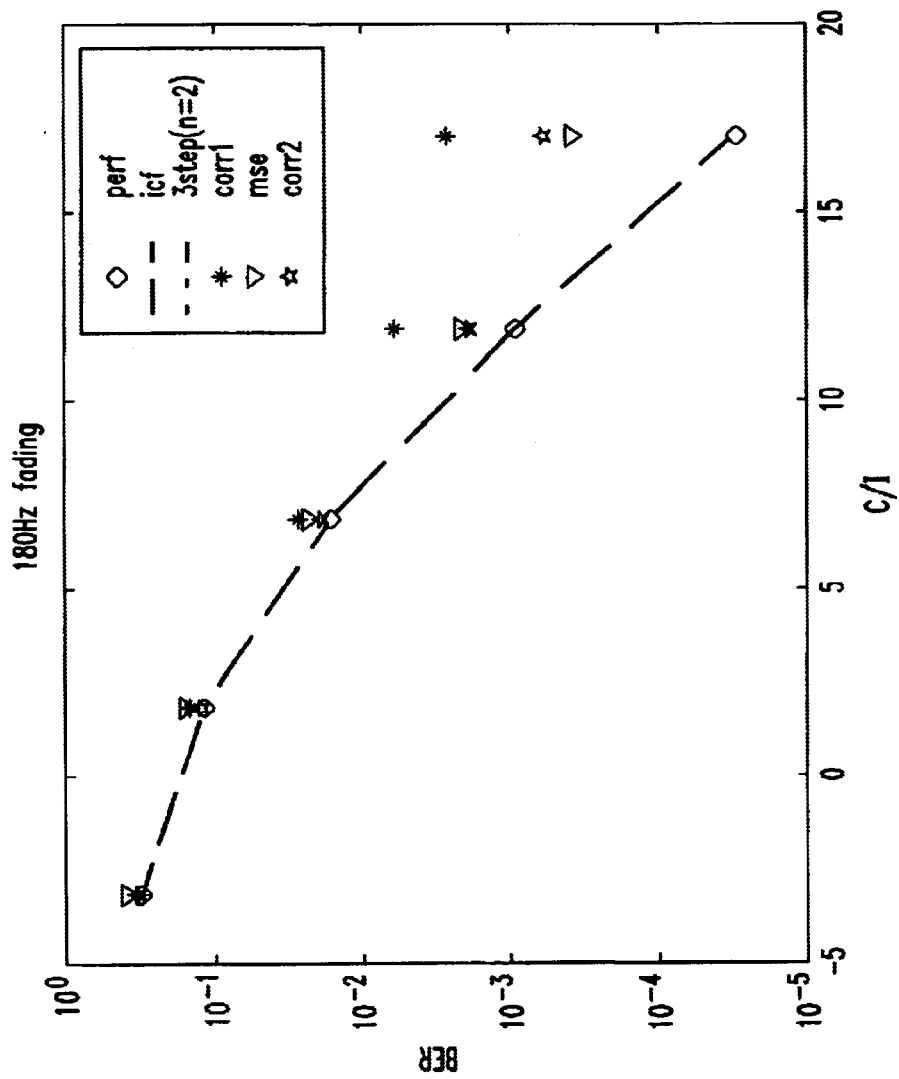
Figure 11:
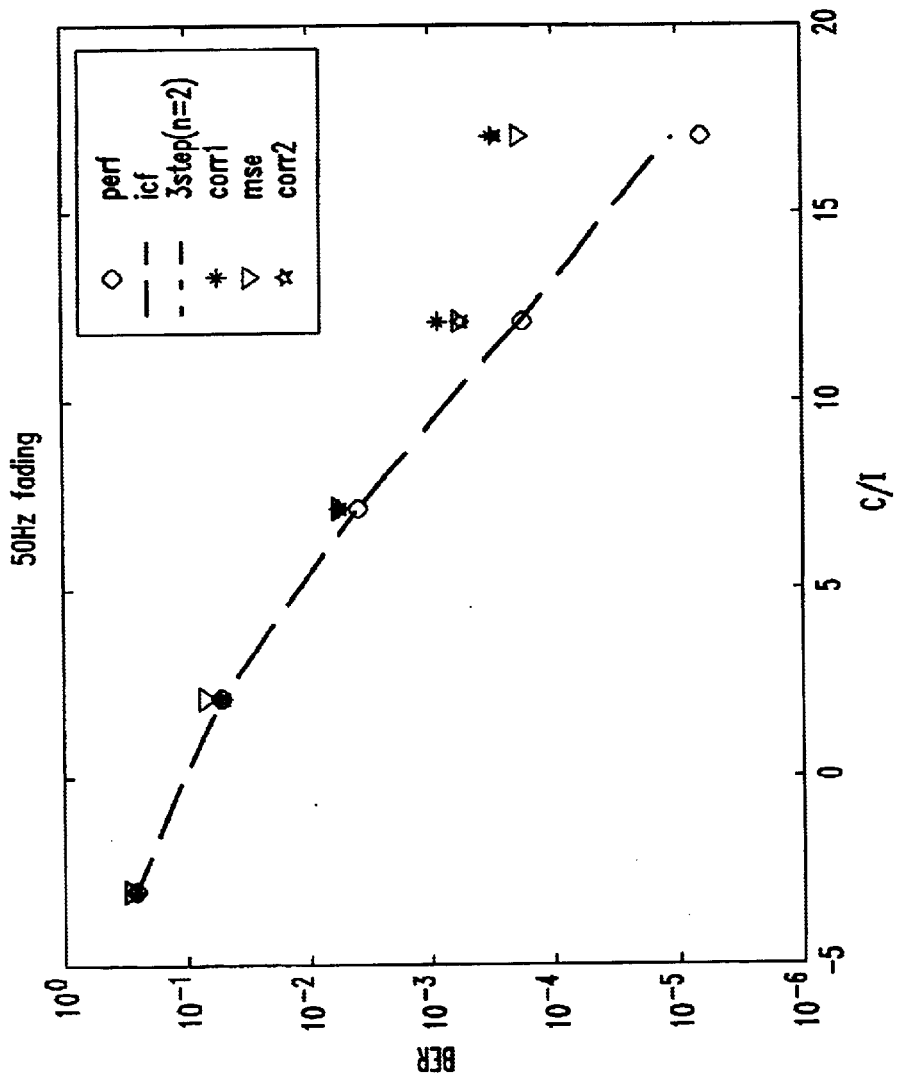
Figure 12:
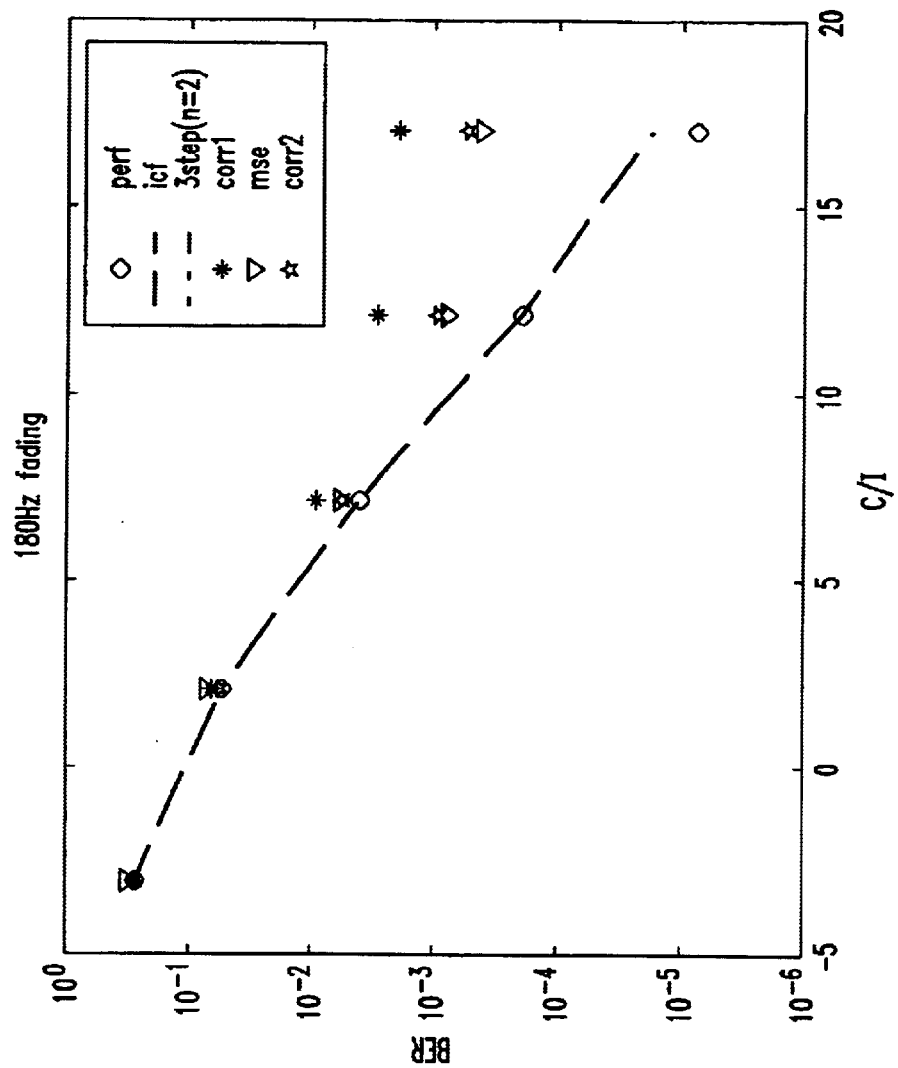

In FIGS. 9–12, maximum ratio combining (MRC) and differential decoding is used for the diversity combining and demodulation after the symbol time synchronization. Two interferers are simulated. In FIGS. 9–10, both interferers appear in the whole time slot. In FIGS. 11–12, one interferer appears in part of the time slot and the other interferer appears in the rest of the time slot. The SNR is 20 dB. The fading rate is 50 Hz in FIGS. 9 and 11 and 180 Hz in FIGS. 10 and 12 for the fading signal and interference signal(s).

In FIGS. 13–20, 1000 to 5000 frames are used for each data point in the simulations with the larger number of frames used at lower BER to get more accurate results.

Figure 13:
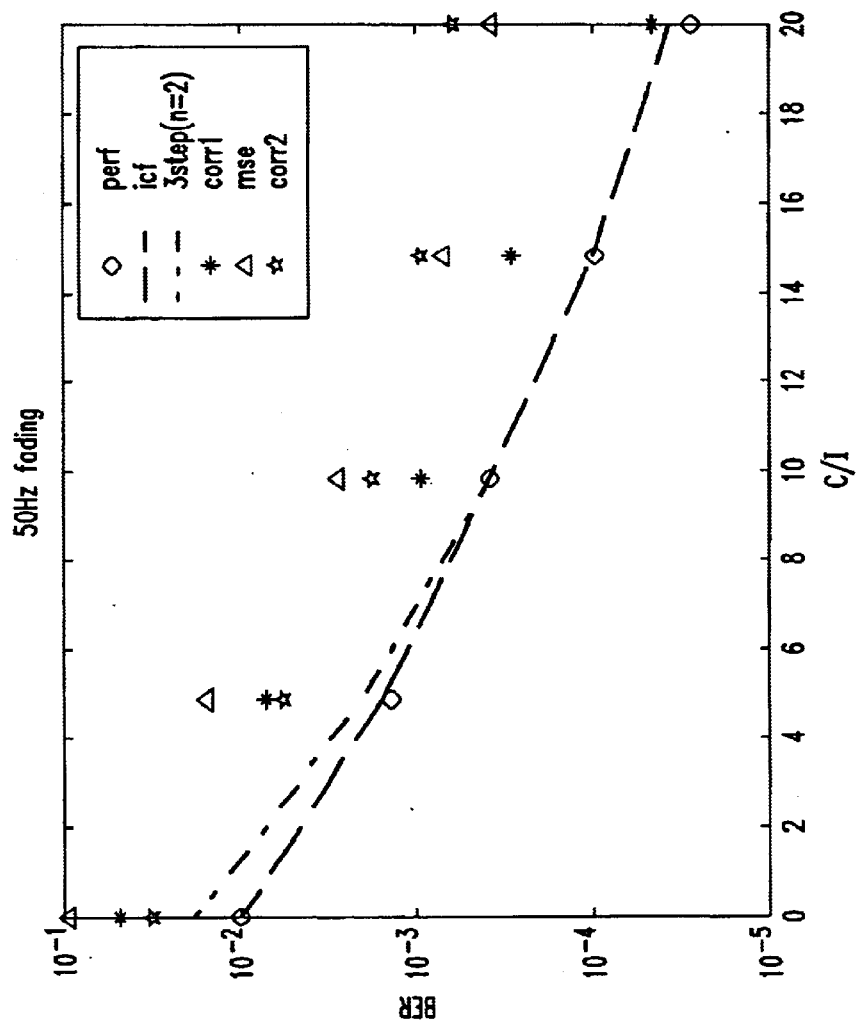
Figure 14:
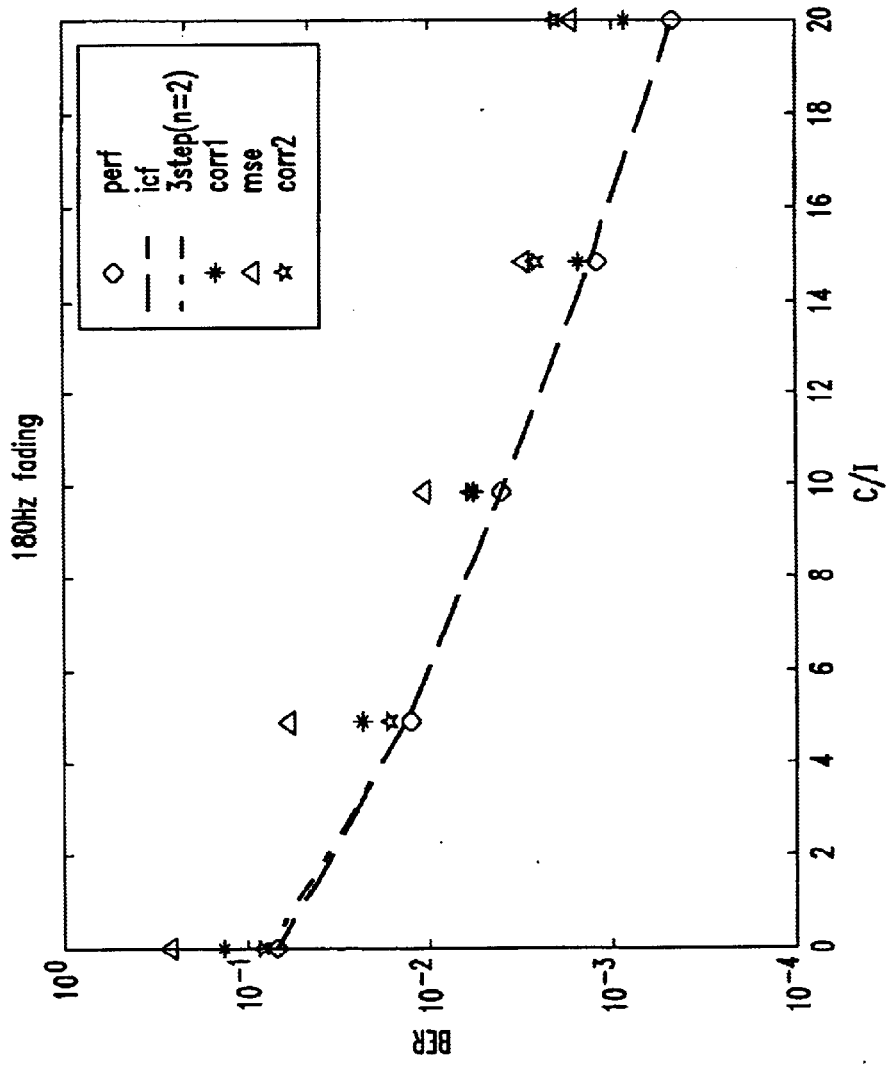
Figure 15:
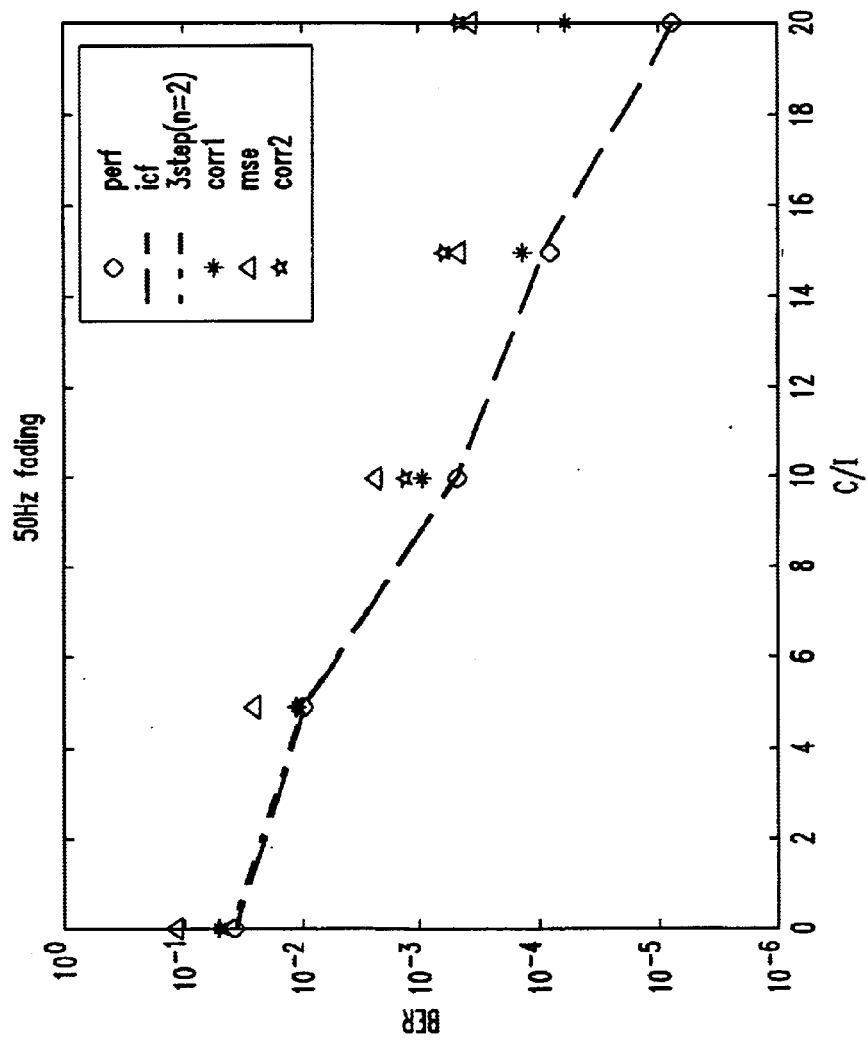
Figure 16:
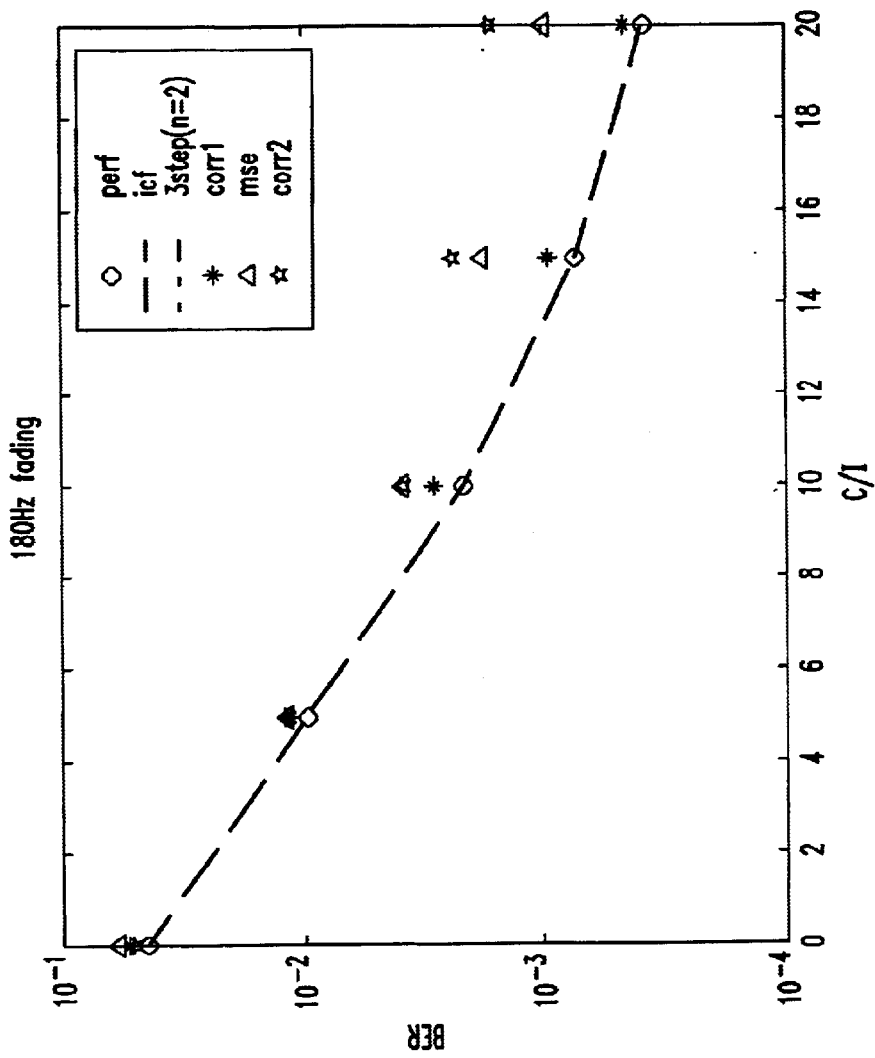

In FIGS. 13–16, FBIA and differential decoding are used for the diversity combining and demodulation after the time synchronization is finished. The diagonal loading factor is chosen to be 0.0322. One interferer is simulated. In FIGS. 13–14, the interference appears in the whole time slot. In FIGS. 15–16, the interference appears only in part of the time slot. The SNR is 20 dB. The fading rate is 50 Hz in FIGS. 13 and 15 and 180 Hz in FIGS. 14 and 16 for both the fading signal and interference signal(s).

Figure 17:
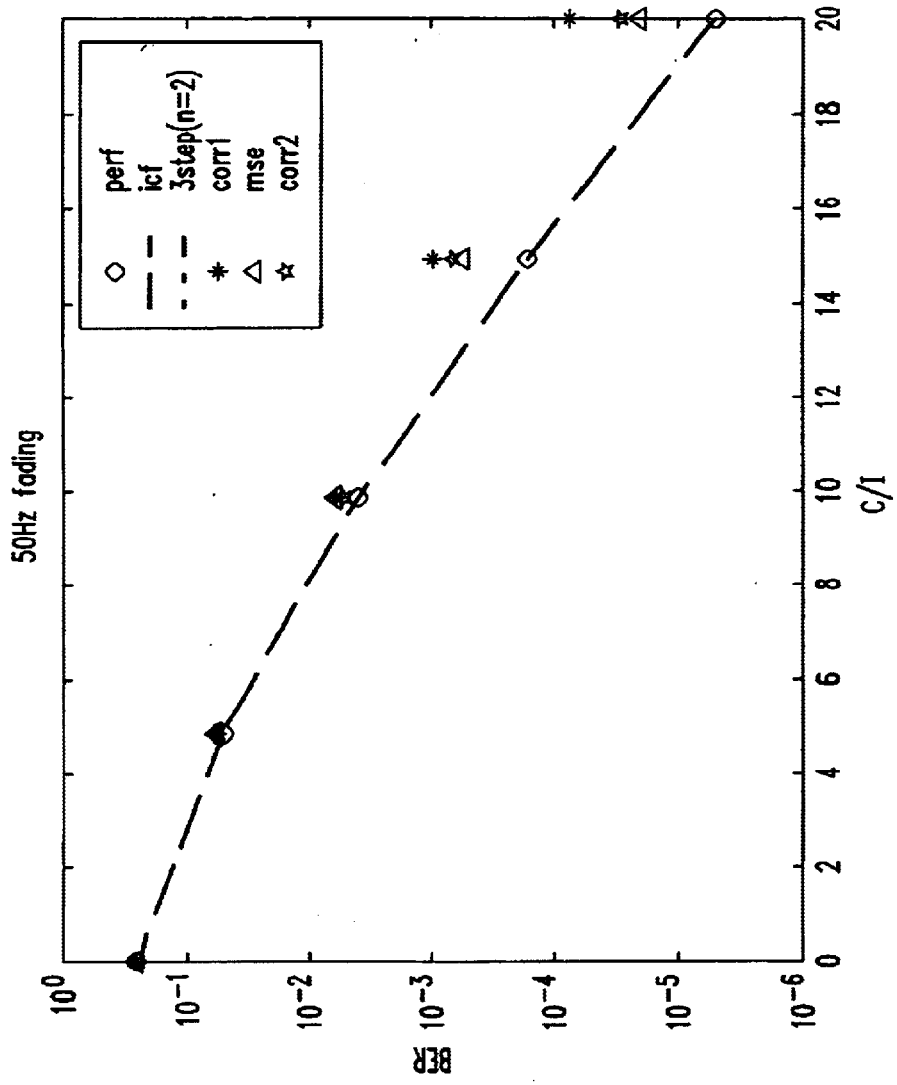
Figure 18:
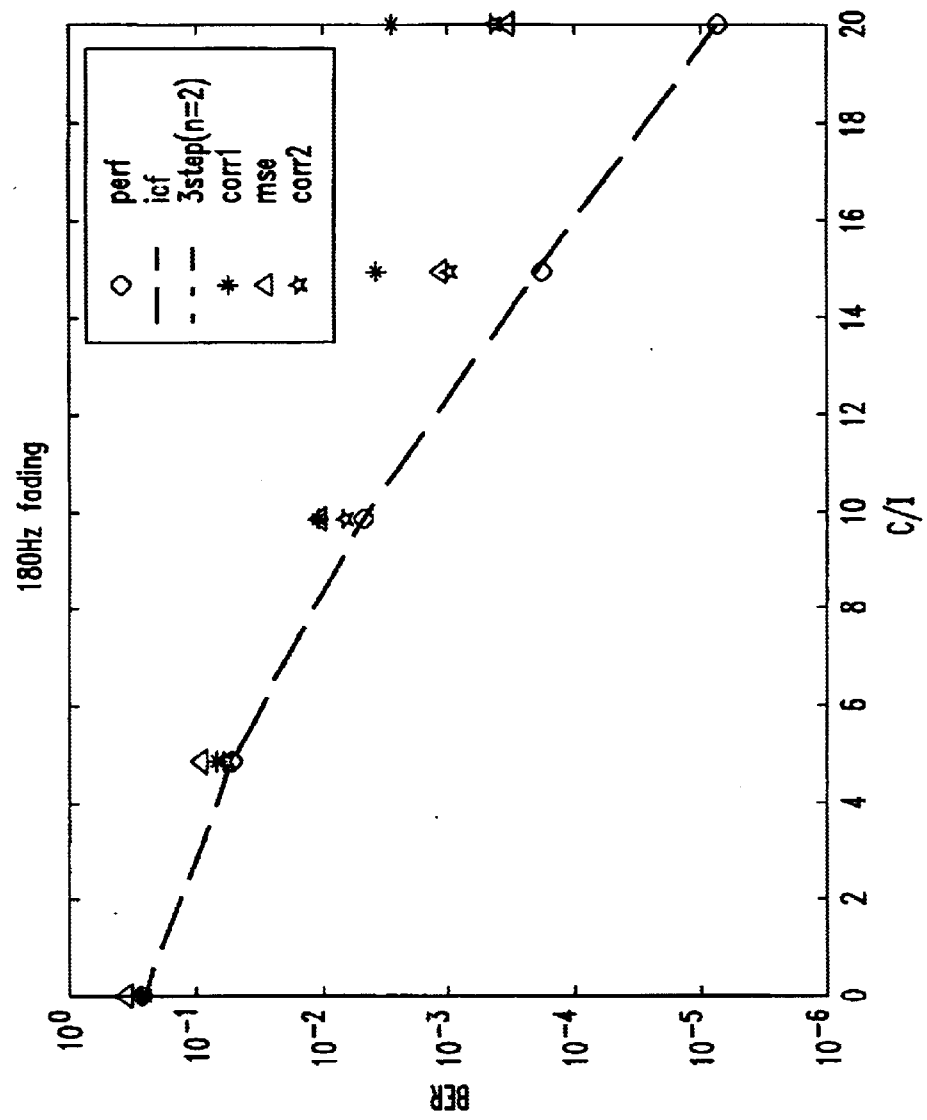
Figure 19:
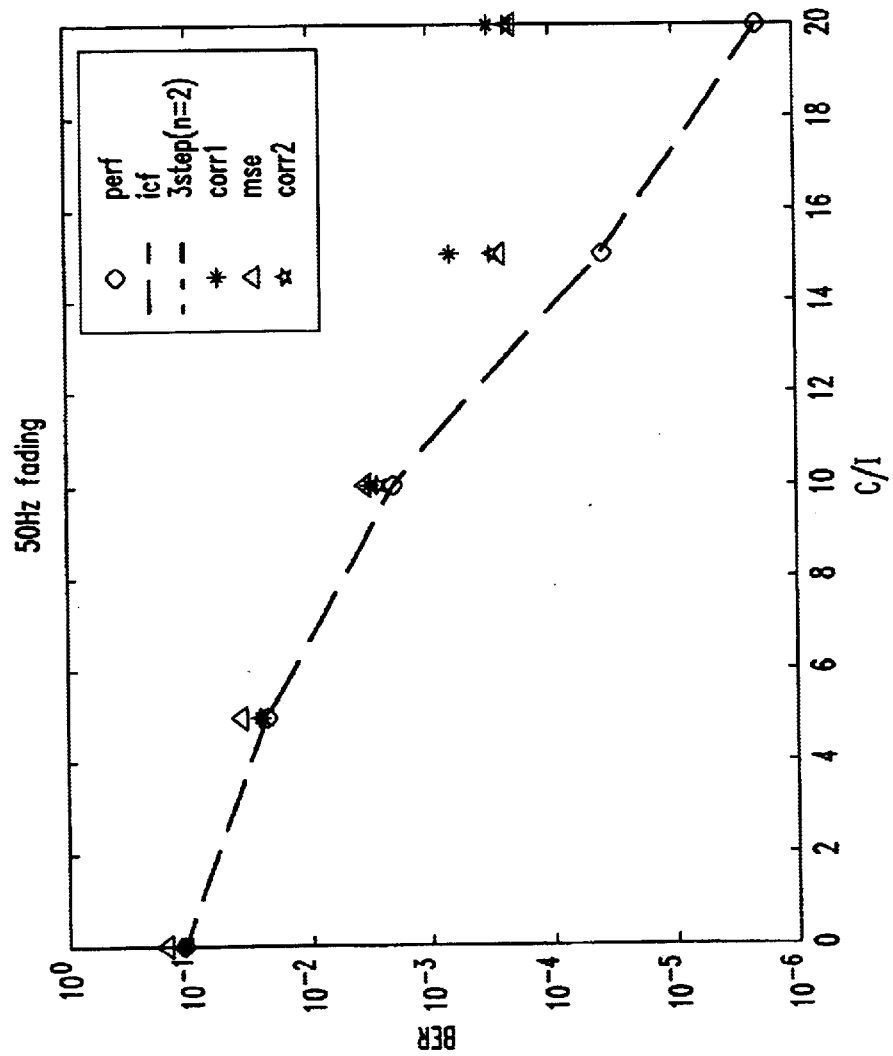
Figure 20:
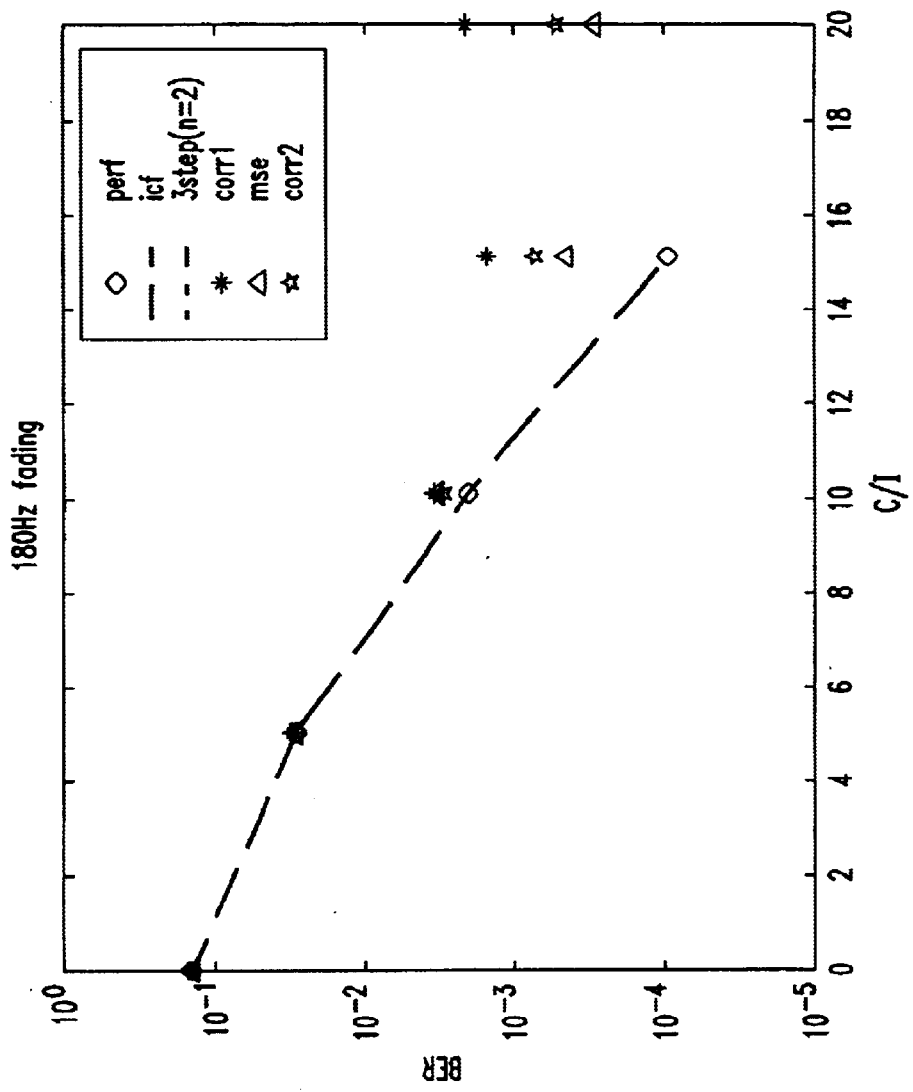

In FIGS. 17–20, Maximum Ratio Combining (MRC) and differential decoding is used for the diversity combining and demodulation after the symbol time synchronization. One interferer is simulated. In FIGS. 17–18, the interference appears in the whole time slot. In FIGS. 19–20, the interference appears only in part of the time slot. The SNR is 20 dB. The fading rate is 50 Hz in FIGS. 17 and 19 and 180 Hz in FIGS. 18 and 20 for both the fading signal and interference signal(s).

In FIGS. 23–28, the performance of different algorithms at noise limited cases are evaluated. 1000 frames are used for each data point in the simulations.

Figure 23:
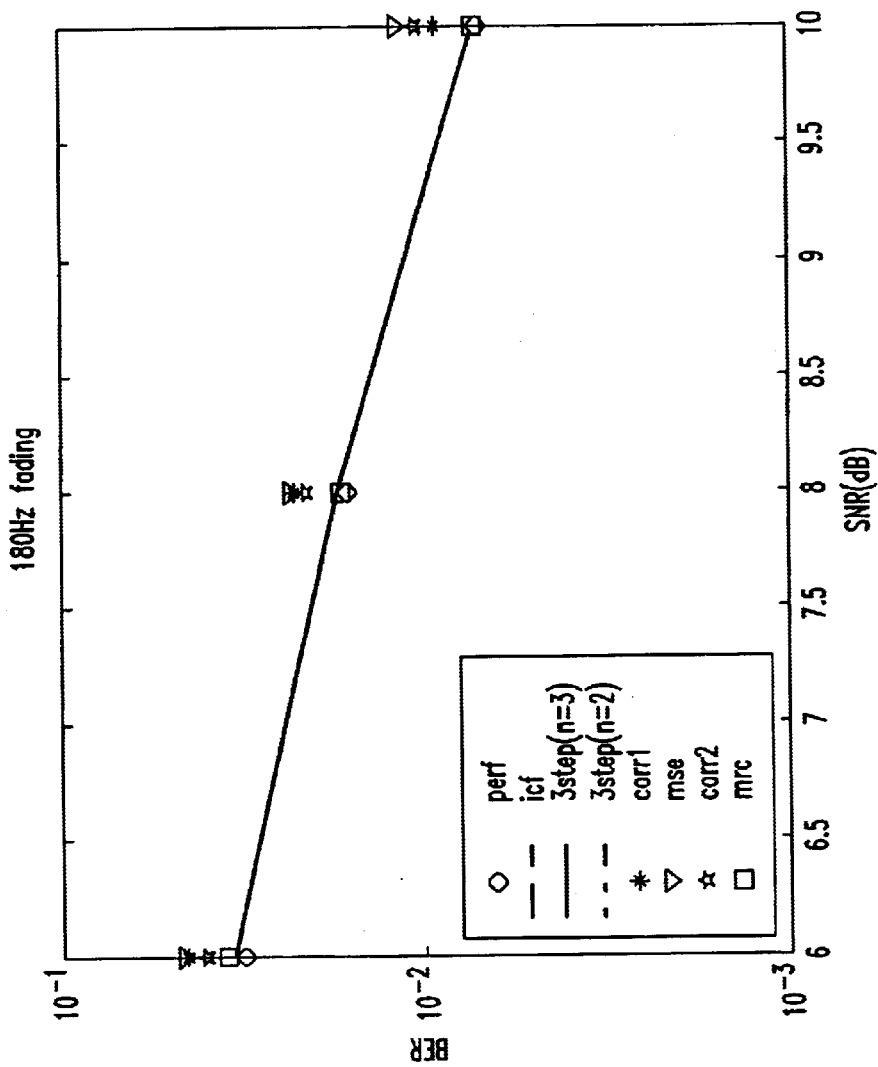
Figure 24:
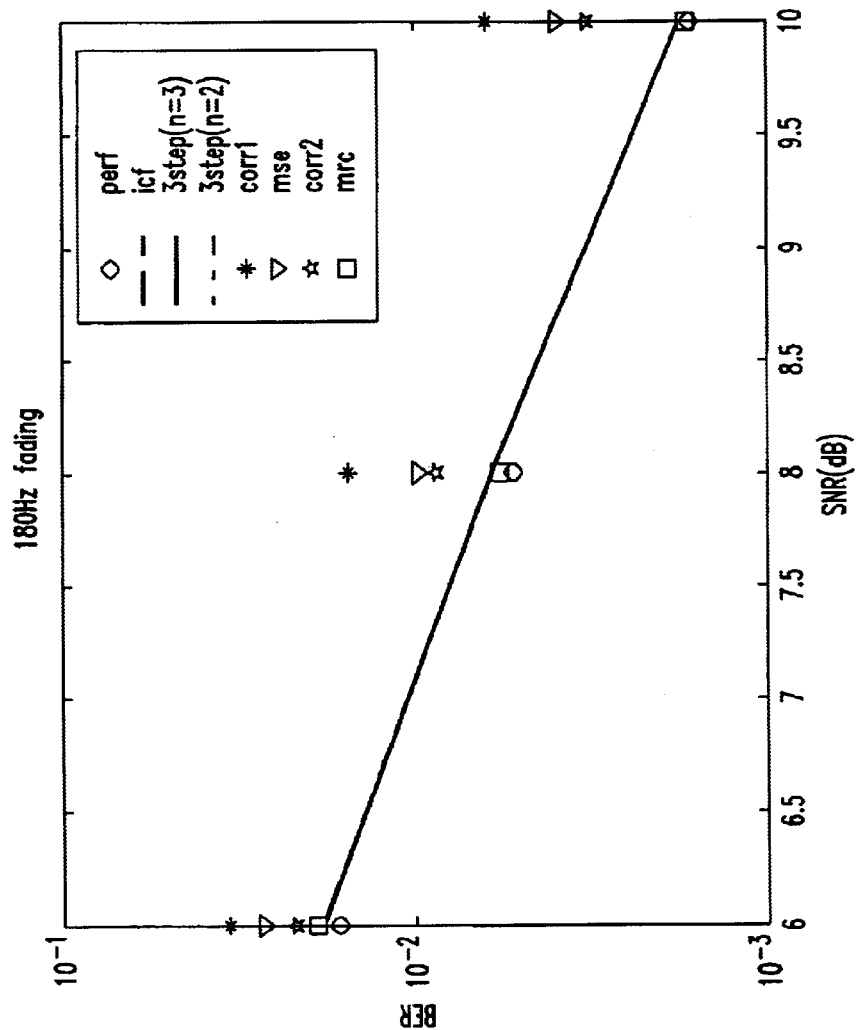
Figure 25:
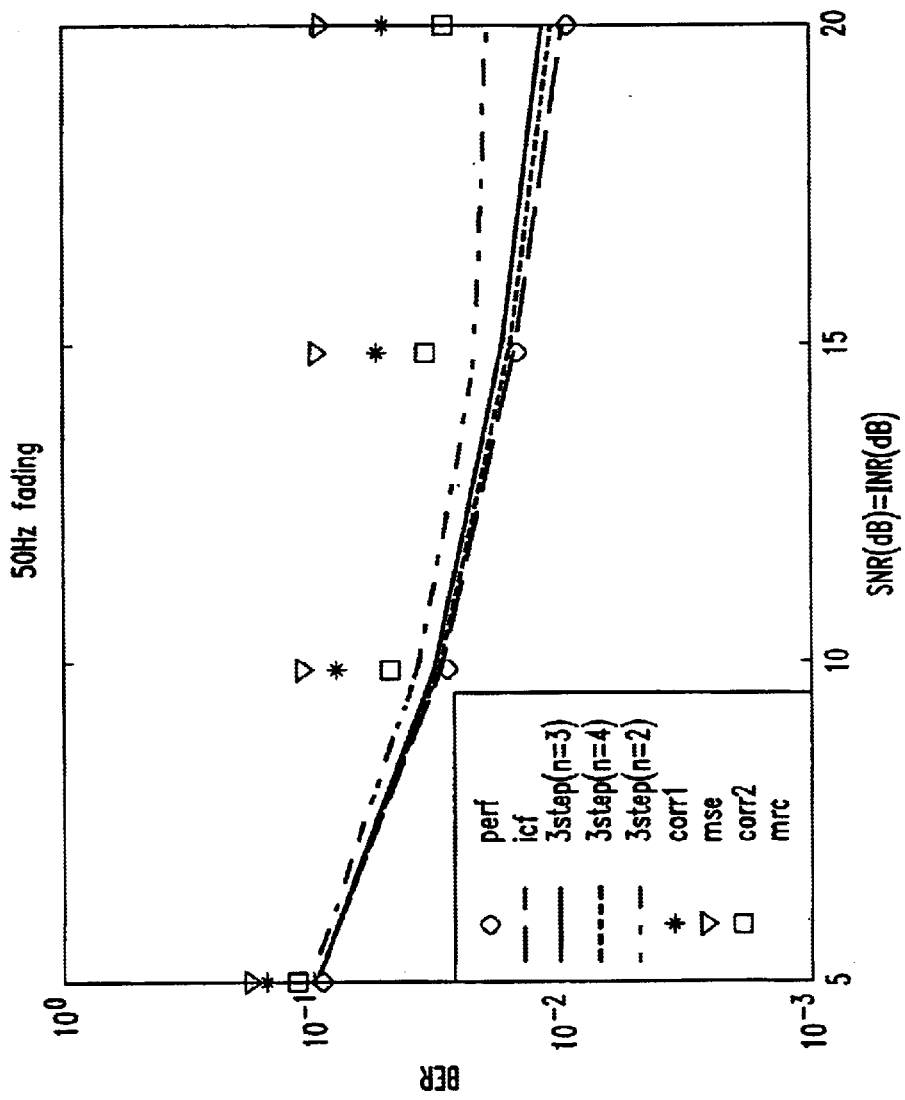

In FIGS. 23–25, FBIA and differential decoding are used for diversity combining and demodulation after the time synchronization is finished. The diagonal loading factor is chosen to be 0.0322. The fading rate is 0, 50 and 180 Hz in FIGS. 23, 24 and 25, respectively.

Figure 26:
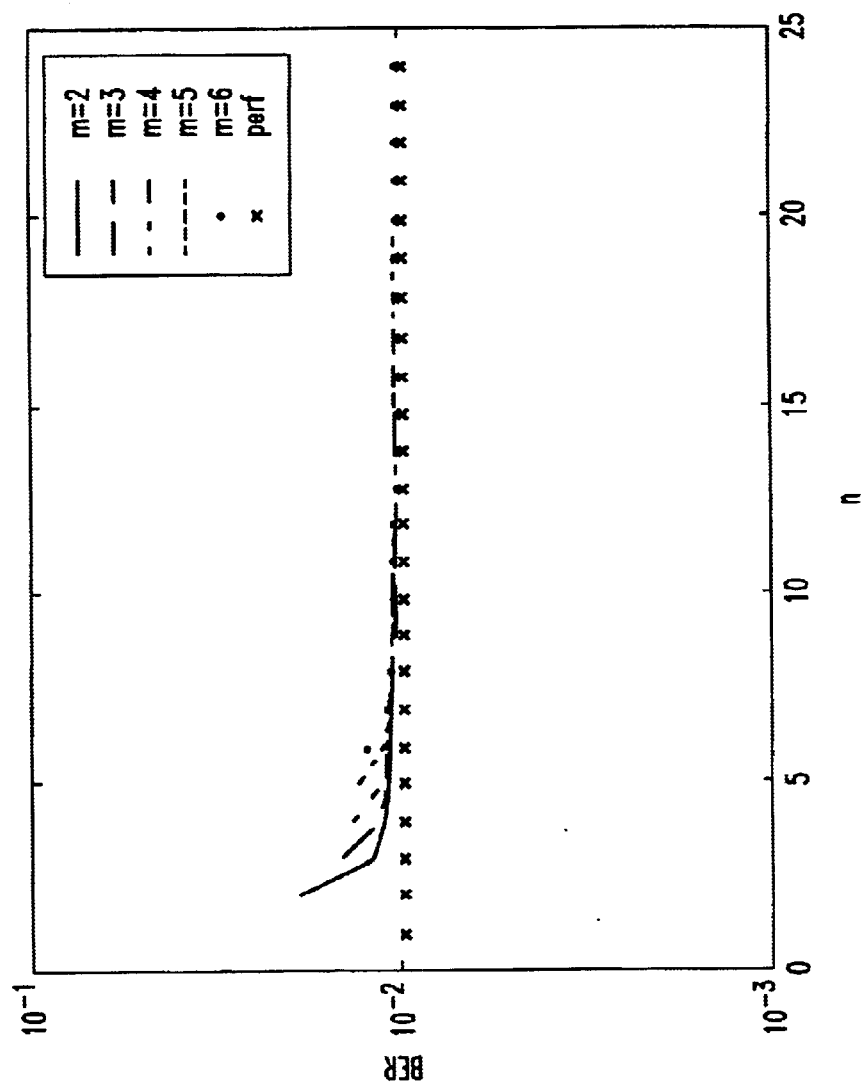
Figure 27:
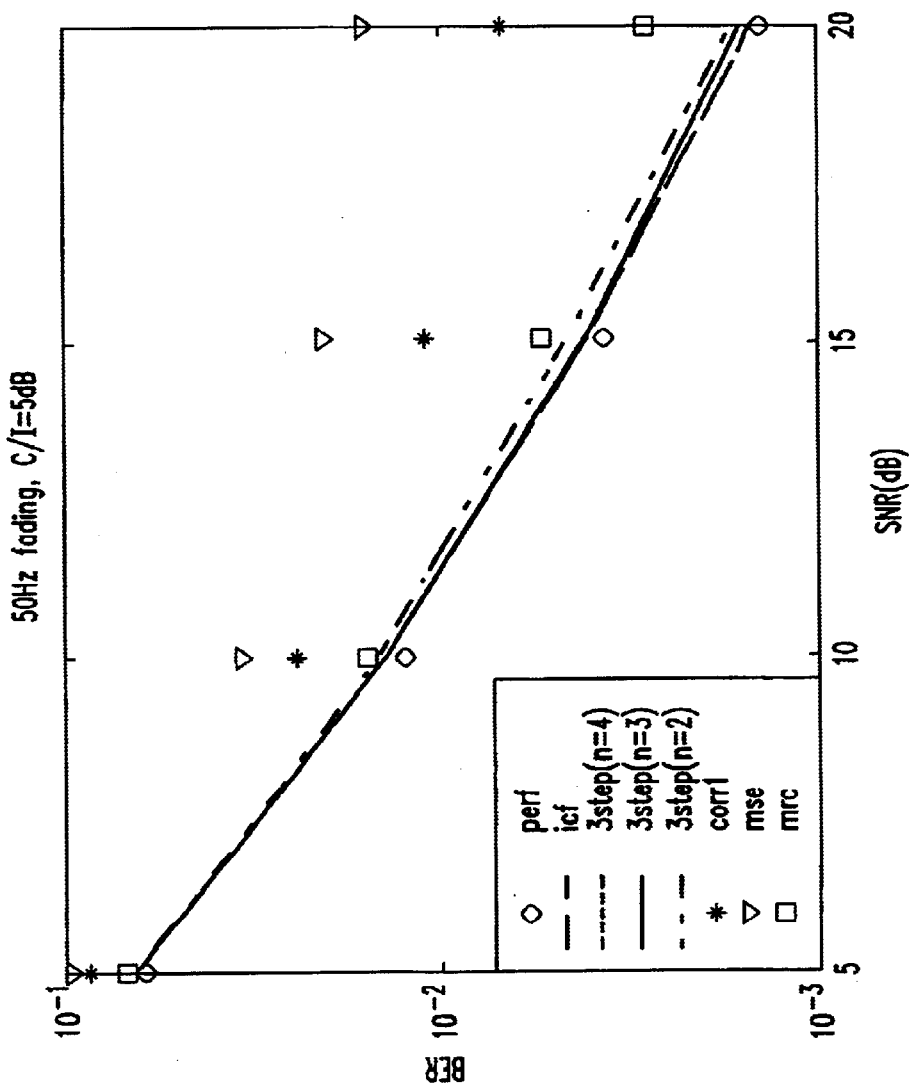
Figure 28:
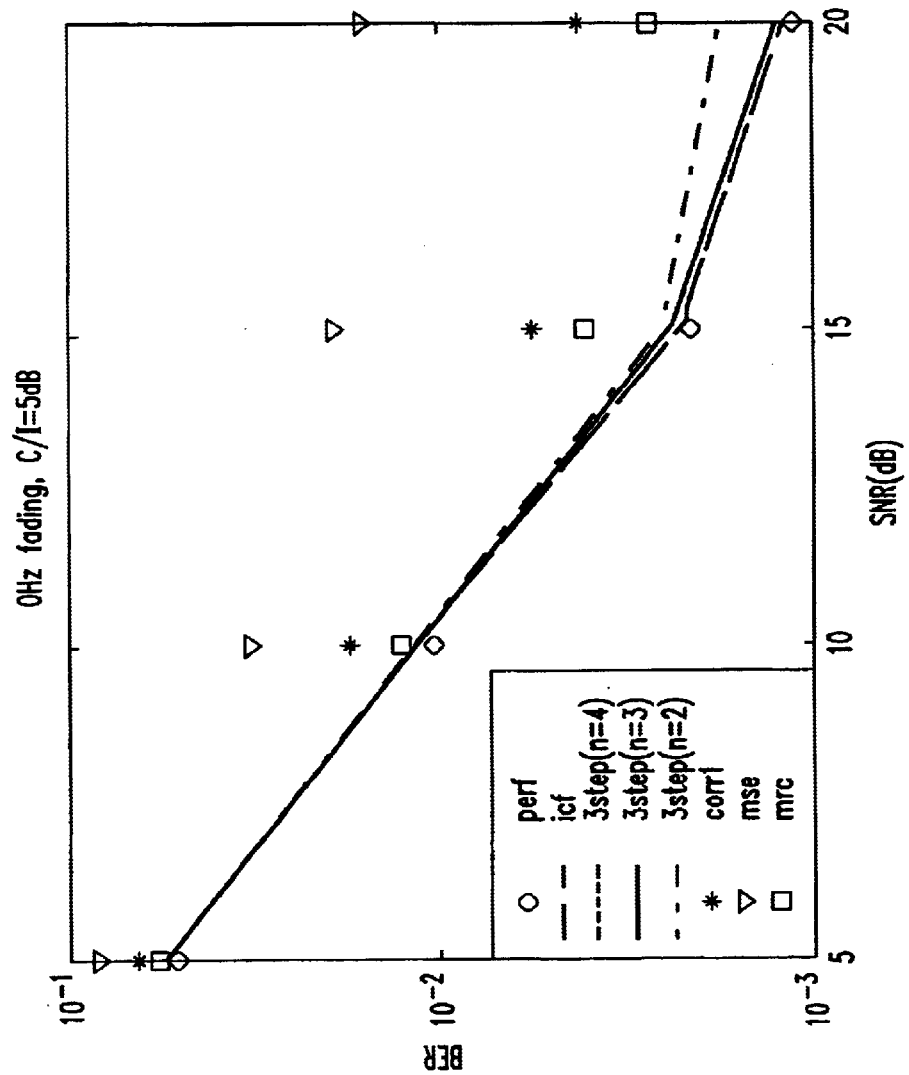
Figure 29:
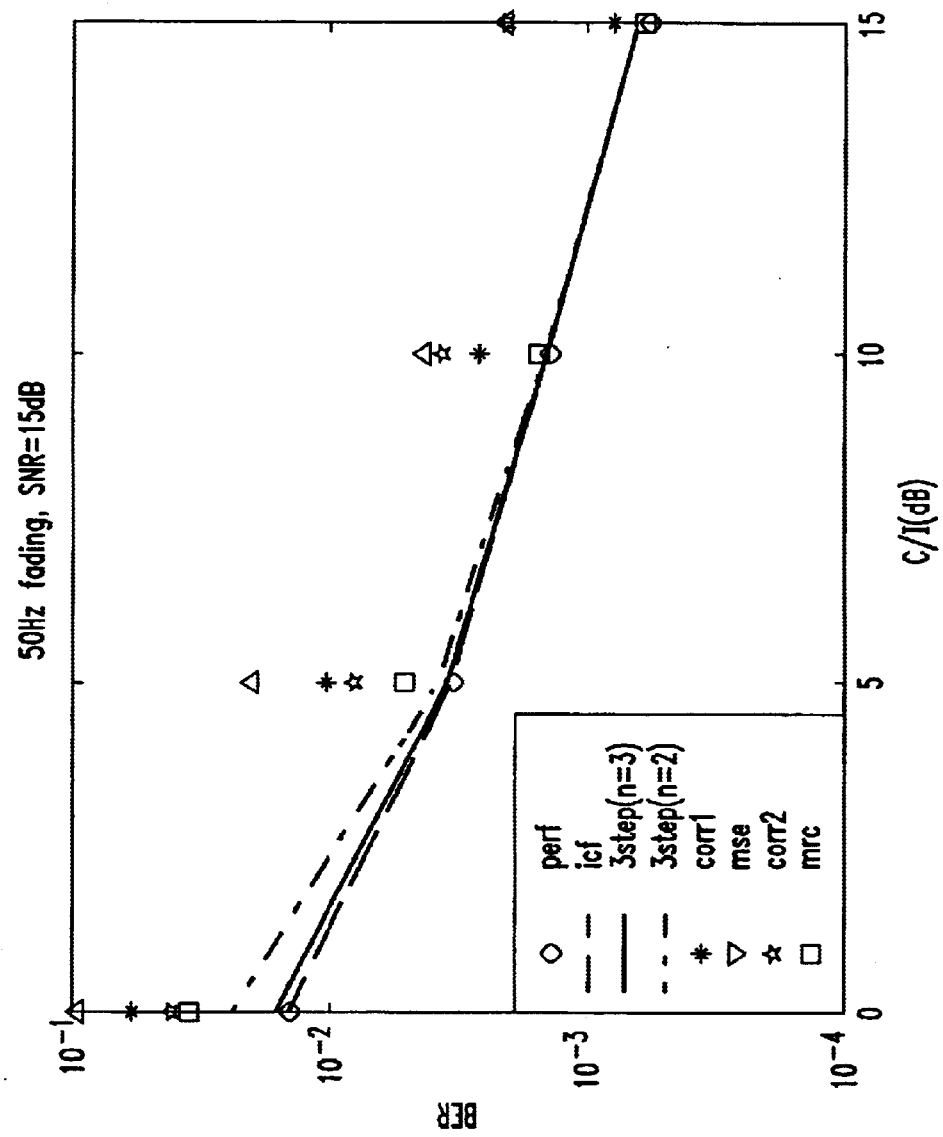
Figure 30:
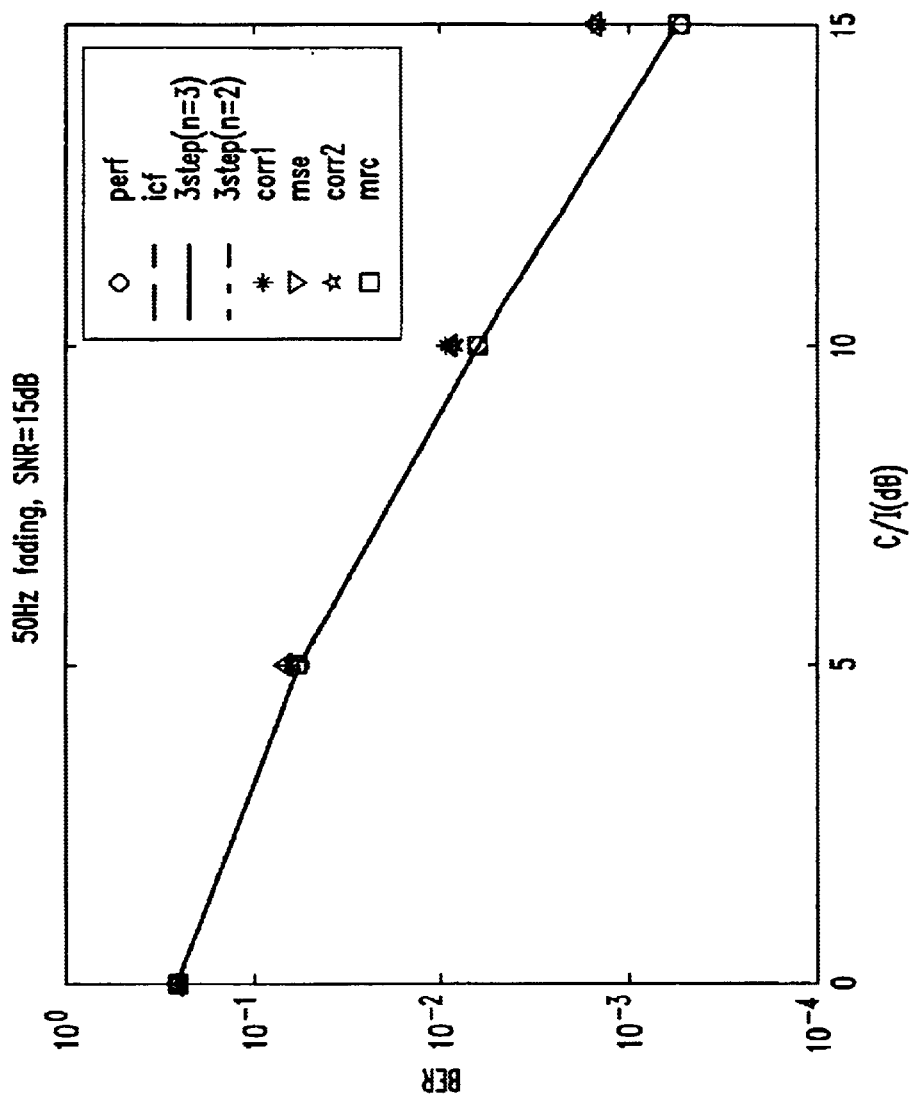

In FIGS. 26–28, MRC and differential decoding are used for diversity combining and demodulation after the time synchronization is finished. The fading rate is 0, 50 and 180 Hz in FIGS. 26, 27 and 28, respectively.

All the simulation results in FIGS. 5–20 show that there is a significant performance improvement provided by the three-step algorithm over the prior art techniques. The interference-cancellation-first (ICF) technique causes negligible BER performance degradation compared to the ideal case. Although the ICF technique provides the best performance, the performance of three-step with m=2 and n=2 is very close to the ICF technique in almost all the cases; the exceptions are some conditions with one strong interferer. Even in that case, the three-step technique is still better than the prior art approaches. Either the three-step or the ICF technique is more effective in the first case (see FIG. 2) where the fading signal and interference signal(s) are synchronized.

In the worst case of one strong interferer, performance can be improved by increasing n.

Figure 21:
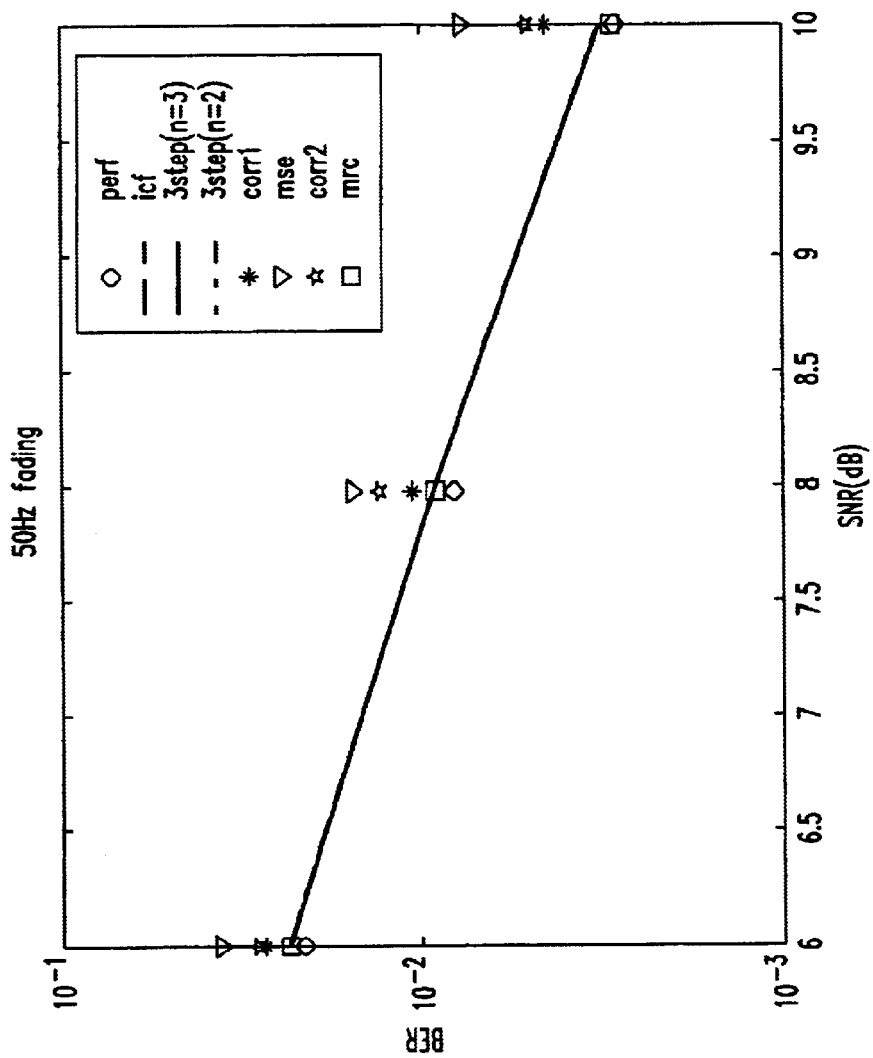

The simulation results in FIG. 21 show the worst case scenario where there is only one interferer and it is as strong as the desired signal. The interference appears in the whole time slot as shown in FIG. 2. The diagonal loading MMSE algorithm (FBIA) and differential decoding are used for the interference cancellation and demodulation after the time synchronization is finished. The diagonal loading factor is chosen to be 0.0322. The SNR is 20 dB. The fading rate is 50 Hz.

Figure 22:
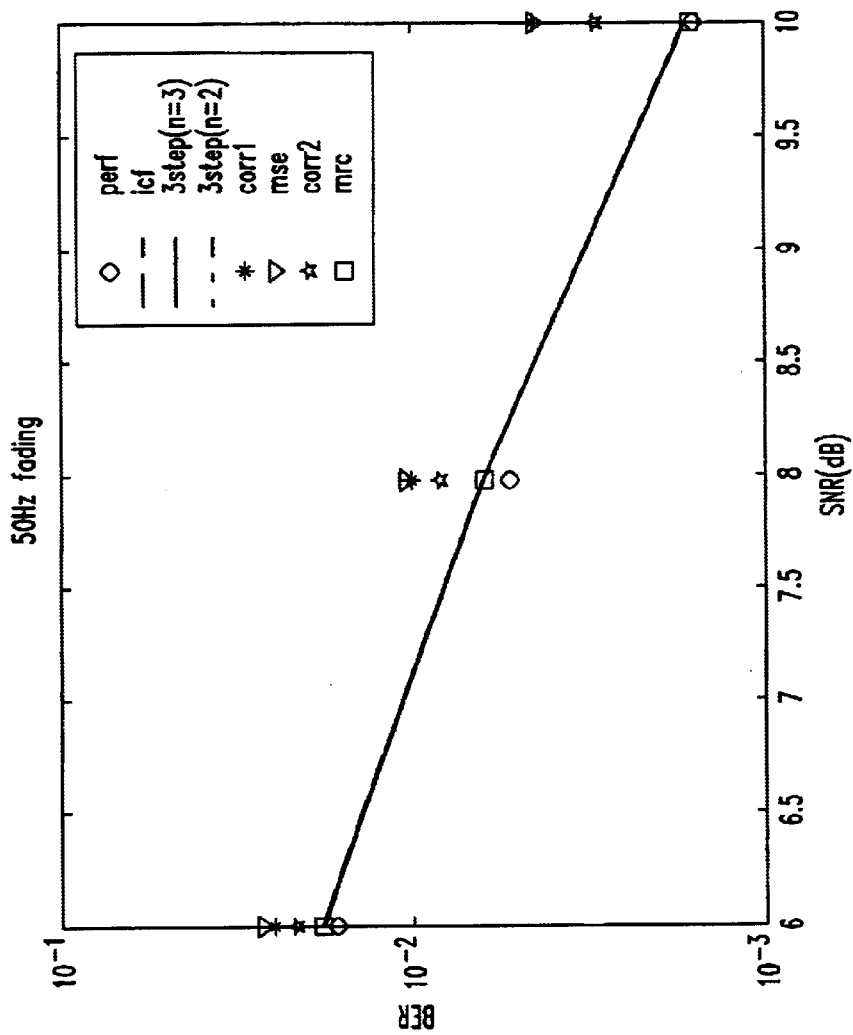

The simulation results in FIG. 22 show that the performance of three-step can be improved by increasing n. At n=3, its performance is already close to that of ICF and at n=8, its performance is extremely close to that of ICF. The three-step technique requires lower computations than the ICF technique in general and requires far less computations when m=2 and n=2.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A timing acquisition algorithm for locating the sync timing position of at least one sync word embedded in a signal received by an antenna array for achieving synchronization between the received signal and a base station within a wireless telecommunications system, said timing acquisition algorithm comprising the steps of:
   (a) eliminating at least one unlikely sync timing position of a plurality of sync timing positions for each antenna branch of the antenna array;
   (b) eliminating at least one unlikely sync timing position from the remaining sync timing positions following step (a) of the plurality of sync timing positions for all antenna branches of the antenna array; and
   (c) locating the timing position of the received signal by combining the remaining sync timing positions following step (b).

2. The timing acquisition algorithm according to claim 1, wherein step (c) further comprises the step of using a correlation or mean-square-error (MSE) approach on the combined remaining sync timing positions following step (b) to locate the timing position of the received signal.

3. The timing acquisition algorithm according to claim 1, wherein the step of eliminating at least one unlikely sync timing position for each antenna branch of the antenna array comprises the steps of:
   computing cross-correlation values of received samples and a designated sync word over a predetermined range of samples for each antenna branch;
   computing the magnitude of each of the correlation values for each antenna branch;
   finding a first predetermined number of correlation values having the largest magnitude and their corresponding sync timing position for each antenna branch; and
   eliminating a remaining number of correlation values for each antenna branch, whereby the remaining number of correlation values correspond to unlikely sync timing positions for each antenna branch.

4. The timing acquisition algorithm according to claim 3, wherein the predetermined range of samples is the number of samples within a predetermined symbol period.

5. The timing acquisition algorithm according to claim 3, wherein the first predetermined number of correlation values found having the largest magnitude for each antenna branch is an integer.

6. The timing acquisition algorithm according to claim 3, wherein the step of eliminating at least one unlikely sync timing position from the remaining sync timing positions following step (a) of the plurality of sync timing positions for all antenna branches of the antenna array, further comprises the steps of:

finding a second predetermined number of correlation values having the largest magnitude from among the first predetermined number of correlation values having the largest magnitude for each antenna branch, wherein the second predetermined number is less than the first predetermined number; and eliminating a remaining number of correlation values for all antenna branches, whereby the remaining number of correlation values correspond to unlikely sync timing positions for all antenna branches.

7. The timing acquisition algorithm according to claim 6, wherein the second predetermined number of correlation values found having the largest magnitude is an integer.

8. The timing acquisition algorithm according to claim 6, wherein the step of locating the timing position of the received signal by combining the remaining sync timing positions following step (b), comprises the steps of:

finding antenna weights corresponding to the remaining sync timing positions following step (b) which correspond to samples associated with the second predetermined number of correlation values;

combining the samples corresponding to the second predetermined number of correlation values with the corresponding weights to form combined sample sets;

processing the combined sample sets; and identifying the sync timing position of the received signal from the processed combined sample sets.

9. The timing acquisition algorithm according to claim 8, wherein the step of processing the combined sample sets comprises the step of using a correlation or a mean-square-error approach on each of the combined sample sets to obtain a correlation value for each of the combined sample sets or a mean-square-error value for each of the combined sample sets.

10. The timing acquisition algorithm according to claim 9, wherein the step of identifying the sync timing position comprises the step of identifying the sync timing position of the received signal as the sync timing position associated with the greatest correlation value or lowest mean-square-error value.

11. A wireless telecommunications system comprising:

at least one receiver for receiving at least one signal embedded with at least one sync word; and a processor utilizing a timing acquisition algorithm for locating the sync timing position of the received signal for synchronizing the received signal and a base station, wherein the timing acquisition algorithm comprises the steps of:

(a) eliminating at least one unlikely sync timing position of a plurality of sync timing positions for each antenna branch of the antenna array;

(b) eliminating at least one unlikely sync timing position from the remaining sync timing positions following step (a) of the plurality of sync timing positions for all antenna branches of the antenna array; and (c) locating the timing position of the received signal by combining the remaining sync timing positions following step (b).

12. The system according to claim 11, wherein step (c) further comprises the step of using a correlation or mean-square-error (MSE) approach on the combined remaining sync timing positions following step (b) to locate the timing position of the received signal.

13. The system according to claim 11, wherein the step of eliminating at least one unlikely sync timing position for each antenna branch of the antenna array comprises the steps of:

computing cross-correlation values of received samples and a designated sync word over a predetermined range of samples for each antenna branch;

computing the magnitude of each of the correlation values for each antenna branch;

finding a first predetermined number of correlation values having the largest magnitude and their corresponding sync timing position for each antenna branch; and eliminating a remaining number of correlation values for each antenna branch, whereby the remaining number of correlation values correspond to unlikely sync timing positions for each antenna branch.

14. The system according to claim 13, wherein the predetermined range of samples is the number of samples within a predetermined symbol period.

15. The system according to claim 13, wherein the first predetermined number of correlation values found having the largest magnitude for each antenna branch is an integer.

16. The system according to claim 13, wherein the step of eliminating at least one unlikely sync timing position from the remaining sync timing positions following step (a) of the plurality of sync timing positions for all antenna branches of the antenna array, further comprises the steps of:

finding a second predetermined number of correlation values having the largest magnitude from among the first predetermined number of correlation values having the largest magnitude for each antenna branch, wherein the second predetermined number is less than the first predetermined number; and eliminating a remaining number of correlation values for all antenna branches, whereby the remaining number of correlation values correspond to unlikely sync timing positions for all antenna branches.

17. The system according to claim 16, wherein the second predetermined number of correlation values found having the largest magnitude is an integer.

18. The system according to claim 16, wherein the step of locating the timing position of the received signal by combining the remaining sync timing positions following step (b), comprises the steps of:

finding antenna weights corresponding to the remaining sync timing positions following step (b) which correspond to samples associated with the second predetermined number of correlation values;

combining the samples corresponding to the second predetermined number of correlation values with the corresponding weights to form combined sample sets;

processing the combined sample sets; and identifying the sync timing position of the received signal from the processed combined sample sets.

19. The system according to claim 18, wherein the step of processing the combined sample sets comprises the step of using a correlation or a mean-square-error approach on each of the combined sample sets to obtain a correlation value for each of the combined sample sets or a mean-square-error value for each of the combined sample sets.

20. The system according to claim 19, wherein the step of identifying the sync timing position comprises the step of identifying the sync timing position of the received signal as the sync timing position associated with the greatest correlation value or lowest mean-square-error value.

21. A timing acquisition algorithm for locating the sync timing position of at least one sync word embedded in a signal received by an antenna array for achieving synchronization between the received signal and a base station within a wireless telecommunications system, said timing acquisition algorithm comprising the steps of:

(a) eliminating at least one unlikely sync timing position of a plurality of sync timing positions for all antenna branches of the antenna array;

(b) eliminating at least one unlikely sync timing position from the remaining sync timing positions following step (a); and (c) locating the timing position of the received signal by combining the remaining sync timing positions following step (b).

* * * * *